(12) United States Patent
Filhaber

(10) Patent No.: US 12,493,196 B2
(45) Date of Patent: Dec. 9, 2025

(54) SYSTEM AND METHOD FOR REDUCED-SPECKLE LASER LINE GENERATION

(71) Applicant: Cognex Corporation, Natick, MA (US)

(72) Inventor: John F. Filhaber, Norwich, CT (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/977,958

(22) Filed: Oct. 31, 2022

(65) Prior Publication Data

US 2023/0236434 A1 Jul. 27, 2023

Related U.S. Application Data

(63) Continuation of application No. 16/478,804, filed as application No. PCT/US2018/014562 on Jan. 19, (Continued)

(51) Int. Cl.
*H04N 13/254* (2018.01)
*G01B 11/14* (2006.01)
(Continued)

(52) U.S. Cl.
CPC .............. *G02B 27/48* (2013.01); *G01B 11/14* (2013.01); *G01B 11/2518* (2013.01);
(Continued)

(58) Field of Classification Search
CPC .... G02B 27/48; G02B 5/0252; G02B 5/0257; G02B 26/105; G02B 27/30;
(Continued)

(56) References Cited

U.S. PATENT DOCUMENTS 3,829,838 A * 8/1974 Lewis .................... G02B 30/50
359/9
4,011,044 A 3/1977 Uzgiris
(Continued)

FOREIGN PATENT DOCUMENTS

CN 101416114 A 4/2009
CN 101496033 A 7/2009
(Continued)

OTHER PUBLICATIONS

Chinese Application No. 201880012343.6, Notification of Allowance dated May 8, 2021 and Search Report dated Apr. 27, 2021, 4 pages.
(Continued)

*Primary Examiner* — Tung T Vo
(74) *Attorney, Agent, or Firm* — Fish & Richardson P.C.

(57) ABSTRACT

An illumination apparatus for reducing speckle effect in light reflected off an illumination target includes a laser; a linear diffuser positioned in an optical path between an illumination target and the laser to diffuse collimated laser light in a planar fan of diffused light that spreads in one dimension across at least a portion of the illumination target; and a beam deflector to direct the collimated laser light incident on the beam deflector to sweep across different locations on the linear diffuser within an exposure time for illumination of the illumination target by the diffused light. The different locations span a distance across the linear diffuser that provides sufficient uncorrelated speckle patterns, at an image sensor, in light reflected from an intersection of the planar fan of light with the illumination target to add incoherently when imaged by the image sensor within the exposure time.

44 Claims, 15 Drawing Sheets

Related U.S. Application Data 2018, now Pat. No. 11,487,130, which is a continuation of application No. 15/675,629, filed on Aug. 11, 2017, now Pat. No. 10,620,447.

(60) Provisional application No. 62/448,250, filed on Jan. 19, 2017.

(51) Int. Cl.

| | | |
|---|---|---|
| *G01B 11/25* | (2006.01) | |
| *G02B 5/02* | (2006.01) | |
| *G02B 26/10* | (2006.01) | |
| *G02B 27/30* | (2006.01) | |
| *G02B 27/48* | (2006.01) | |

(52) U.S. Cl.
CPC ........ *G01B 11/2522* (2013.01); *G02B 5/0252* (2013.01); *G02B 5/0257* (2013.01); *G02B 26/105* (2013.01); *G02B 27/30* (2013.01); *H04N 13/254* (2018.05)

(58) Field of Classification Search
CPC ............ G02B 27/0927; G02B 27/0938; G02B 27/0966; G01B 11/14; G01B 11/2518; G01B 11/2522; G01B 11/02; H04N 13/254
USPC .......................................................... 348/49
See application file for complete search history.

(56) References Cited

U.S. PATENT DOCUMENTS

| | | | | |
|---|---|---|---|---|
| 4,155,630 | A | | 5/1979 | Ih |
| 4,256,362 | A | * | 3/1981 | Bardos ..................... G03H 1/22 359/33 |
| 4,390,277 | A | * | 6/1983 | Quinn ..................... G01B 11/30 356/613 |
| 4,970,546 | A | | 11/1990 | Suzuki et al. |
| 4,979,815 | A | * | 12/1990 | Tsikos ................ G01B 11/2522 434/4 |
| 5,191,374 | A | * | 3/1993 | Hazama .............. G03F 7/70558 355/53 |
| 5,583,345 | A | * | 12/1996 | Kohgami ............. A61B 6/4225 378/41 |
| 5,648,649 | A | | 7/1997 | Bridgelall et al. |
| 6,081,381 | A | | 6/2000 | Shalapenok et al. |
| 6,183,092 | B1 | | 2/2001 | Troyer |
| 6,317,169 | B1 | | 11/2001 | Smith |
| 6,323,984 | B1 | | 11/2001 | Trisnadi |
| 6,330,057 | B1 | | 12/2001 | Lederer et al. |
| 6,424,407 | B1 | | 7/2002 | Kinrot et al. |
| 6,466,368 | B1 | | 10/2002 | Piepel et al. |
| 6,594,090 | B2 | | 7/2003 | Kruschwitz et al. |
| 6,642,506 | B1 | | 11/2003 | Nahum et al. |
| 6,690,474 | B1 | | 2/2004 | Shirley |
| 6,739,511 | B2 | | 5/2004 | Tsikos et al. |
| 6,800,859 | B1 | | 10/2004 | Shishido et al. |
| 7,164,810 | B2 | | 1/2007 | Schnee et al. |
| 7,202,466 | B2 | | 4/2007 | Babayoff et al. |
| 7,413,311 | B2 | | 8/2008 | Govorkov et al. |
| 8,059,340 | B2 | | 11/2011 | Khan et al. |
| 8,113,660 | B1 | | 2/2012 | Troyer |
| 8,727,543 | B2 | * | 5/2014 | Kurashige ................ G03H 1/22 353/38 |
| 9,164,066 | B1 | * | 10/2015 | Bossi ..................... G01N 29/225 |
| 9,250,213 | B1 | * | 2/2016 | Bossi ..................... G01N 29/265 |
| 10,620,447 | B2 | * | 4/2020 | Filhaber ................. G02B 27/48 |
| 2001/0021026 | A1 | * | 9/2001 | Liu ..................... G02B 27/1093 356/601 |
| 2002/0014577 | A1 | | 2/2002 | Ulrich |
| 2003/0026457 | A1 | | 2/2003 | Nahum |
| 2004/0012833 | A1 | * | 1/2004 | Newswanger ....... G03H 1/0476 359/35 |
| 2004/0051806 | A1 | * | 3/2004 | Cambou ............ H10F 39/8063 348/340 |
| 2005/0200838 | A1 | * | 9/2005 | Shaw .................. G01N 21/8806 356/237.1 |
| 2005/0207160 | A1 | * | 9/2005 | Babayoff ........... G02B 21/0032 362/268 |
| 2005/0234348 | A1 | | 10/2005 | Watanabe |
| 2005/0264796 | A1 | * | 12/2005 | Shaw .................... G01N 21/954 356/237.2 |
| 2006/0203483 | A1 | * | 9/2006 | Rains Jr. ............... G02B 5/0278 362/231 |
| 2007/0058135 | A1 | | 3/2007 | Morikawa et al. |
| 2007/0138284 | A1 | | 6/2007 | Giordano et al. |
| 2007/0183473 | A1 | * | 8/2007 | Bicknell ................ H01S 5/4062 372/50.12 |
| 2008/0024753 | A1 | * | 1/2008 | Gladnick ................ G01B 11/25 356/3.01 |
| 2008/0100890 | A1 | * | 5/2008 | Curtis ..................... G03H 1/265 359/30 |
| 2008/0180776 | A1 | | 7/2008 | Park et al. |
| 2008/0225904 | A1 | * | 9/2008 | Brown .................... H01S 3/225 372/25 |
| 2008/0267241 | A1 | | 10/2008 | Brown et al. |
| 2009/0009842 | A1 | * | 1/2009 | Destain ................. G03B 21/10 359/209.1 |
| 2009/0168134 | A1 | * | 7/2009 | Nojima ................ H04N 9/3129 359/214.1 |
| 2009/0185251 | A1 | | 7/2009 | Chen et al. |
| 2009/0213350 | A1 | * | 8/2009 | Sogard .................... G03B 27/54 359/599 |
| 2009/0296758 | A1 | * | 12/2009 | Brown .................. G03F 7/7055 372/25 |
| 2010/0020011 | A1 | | 1/2010 | Doumuki |
| 2012/0147919 | A1 | | 6/2012 | Hisanaga et al. |
| 2013/0076857 | A1 | * | 3/2013 | Kurashige .............. G01B 11/25 348/40 |
| 2013/0242275 | A1 | | 9/2013 | Kilcher |
| 2014/0022616 | A1 | * | 1/2014 | Popovich ............ G02F 1/13342 359/15 |
| 2014/0092321 | A1 | | 4/2014 | Kurashige |
| 2015/0176977 | A1 | | 6/2015 | Abele et al. |
| 2015/0316892 | A1 | * | 11/2015 | Kurashige ................ G03H 1/32 348/40 |
| 2016/0012291 | A1 | | 1/2016 | Cleland et al. |
| 2016/0170226 | A1 | * | 6/2016 | Popovich ............. G03B 21/008 362/277 |
| 2016/0327779 | A1 | * | 11/2016 | Hillman .............. G02B 21/0032 |
| 2018/0203249 | A1 | | 7/2018 | Filhaber |
| 2018/0299251 | A1 | * | 10/2018 | Liba ....................... G02B 27/48 |
| 2018/0309961 | A1 | * | 10/2018 | Kurashige ........... G03H 1/2286 |

FOREIGN PATENT DOCUMENTS

| | | |
|---|---|---|
| CN | 101416114 B | 3/2011 |
| CN | 102326169 A | 1/2012 |
| CN | 102670304 A | 9/2012 |
| CN | 103097857 | 5/2013 |
| CN | 103123419 A | 5/2013 |
| CN | 103857982 | 6/2014 |
| CN | 105066908 A | 11/2015 |
| DE | 202006007691 | 8/2006 |
| EP | 3064895 | 9/2016 |
| JP | 2004191735 | 7/2004 |
| JP | 3955513 | 8/2007 |
| JP | 2009294249 | 12/2009 |
| JP | 2012093238 | 5/2012 |
| JP | 2013011908 | 1/2013 |
| JP | 2014232041 A | 12/2014 |
| JP | 2015145972 | 8/2015 |
| WO | WO 1979/00841 | 10/1979 |
| WO | WO 2000/17810 | 3/2000 |
| WO | WO 2006/072149 | 7/2006 |
| WO | WO 2006/137326 | 12/2006 |

(56) References Cited

FOREIGN PATENT DOCUMENTS

WO    WO 2009/077198    6/2009
WO    WO 2012/032668    3/2012

OTHER PUBLICATIONS

Chinese Patent Application No. 201880012343.6, First Office Action dated Nov. 26, 2020, 7 pages.
European Application No. 18702882.4, Communication pursuant to Article 94(3) EPC, dated Dec. 8, 2020, 4 pages.
Falko Riechert, "Speckle Reduction in Projection Systems", Dissertation, Universitat Karlsruhe, 2009, 178 pages.
International Application No. PCT/US2018/014562, Notification of Transmittal of the International Search Report and the Written Opinion of the International Searching Authority, mailed Apr. 20, 2018, 15 pages.
Japanese Patent Application No. 2019-539240, Office Action dated Oct. 5, 2021, 6 pages.
U.S. Appl. No. 15/675,629, Final Office action mailed Mar. 30, 2018, 17 pages.
U.S. Appl. No. 15/675,629, Office Action mailed Nov. 15, 2017, 17 pages.
U.S. Appl. No. 15/675,629, Office Action mailed Nov. 7, 2018, 20 pages.
U.S. Appl. No. 15/675,629, Response to Final Office Action under 37 CFR 1.116, filed Oct. 1, 2018, 10 pages.
U.S. Appl. No. 15/675,629, Response to Office Action under 37 CFR 1.111, filed Feb. 15, 2018, 24 pages.
U.S. Appl. No. 15/675,629, Response to Office Action under 37 CFR 1.111, filed May 7, 2019, 14 pages.
Extended European Search Report in European Appln No. 23169208.8, dated Oct. 26, 2023, 8 pages.
Office Action in Japanese Appln. No. 2023-000726, dated Nov. 2, 2023, 11 pages (with English translation).
Office Action in Korean Appln. No. 10-2019-7024059, dated Sep. 1, 2023, 10 pages (with English translation).
Office Action in Vietnam Appln. No. 1-2019-03941, dated Aug. 31, 2023, 4 pages (with English translation).
Office Action in Korean Appln. No. 10-2019-7024059, dated Feb. 23, 2023, 10 pages (with English translation).
Notice of Allowance in Korean Appln. No. 10-2019-7024059, dated Mar. 25, 2024, 4 pages (with English translation).
Office Action in Chinese Appln. No. 202110835804.3, dated Dec. 28, 2023, 40 pages (with English translation).
Notice of Allowance in Japanese Appln. 2023-000726, dated Sep. 3, 2024, 5 pages (with English translation).
Office Action in Chinese Appln. No. 202110835804.3, dated Aug. 27, 2024, 34 pages (with English translation).

\* cited by examiner

SYSTEM AND METHOD FOR REDUCED-SPECKLE LASER LINE GENERATION

RELATED APPLICATION

This application is a continuation application of and claims the benefit of priority to U.S. application Ser. No. 16/478,804, entitled SYSTEM AND METHOD FOR REDUCED-SPECKLE LASER LINE GENERATION, filed Jul. 17, 2019, which is a U.S. National Phase application of International Application No. PCT/US2018/014562, entitled SYSTEM AND METHOD FOR REDUCED-SPECKLE LASER LINE GENERATION, filed Jan. 19, 2018, which claims the benefit of priority under 35 U.S.C. § 119(e)(1) of U.S. Provisional Application Ser. No. 62/448,250, entitled SYSTEM AND METHOD FOR REDUCED-SPECKLE LASER LINE GENERATION, filed Jan. 19, 2017, and of U.S. application Ser. No. 15/675,629, entitled SYSTEM AND METHOD FOR REDUCED-SPECKLE LASER LINE GENERATION, filed Aug. 11, 2017, all teachings of which are expressly incorporated herein by reference.

TECHNICAL FIELD

This disclosure relates to laser line generation and projection systems, apparatuses, devices and methods, and more particularly to laser line generation and projection systems, apparatuses, devices and methods that can be used in three-dimensional (3D) machine vision systems.

BACKGROUND

Speckle is a phenomenon that affects all lasers and laser line projectors. It is caused by the roughness of the surface that is illuminated causing tiny diffractive regions that give the surface a grainy random "speckle" appearance when viewed under laser illumination. The speckle effect is a result of the interference of many waves of the same frequency, having different phases and amplitudes, which add together coherently to give a resultant wave whose amplitude, and therefore intensity, varies randomly. When a surface is illuminated by a light wave, according to diffraction theory, each point on an illuminated surface acts as a source of secondary spherical waves. The light at any point in the scattered light field is made up of waves, which have been scattered from each point on the illuminated surface. If the surface is rough enough to create path-length differences exceeding one wavelength, giving rise to phase changes greater than $2\pi$, the amplitude, and hence the intensity, of the resultant light varies randomly. If light of low coherence (i.e., made up of many wavelengths) is used, a speckle pattern will not normally be observed, because the speckle patterns produced by individual wavelengths have different dimensions and will normally average one another out. However, speckle patterns are inherent in coherent light sources, such as lasers.

Speckle can be problematic in certain imaging applications—for example a laser displacement sensor (DS) system, which projects a planar fan of light onto an object, such that the projected planar fan intersects a 3D surface of the object that faces the DS along an illumination contour, also referred to as an illumination line. Note that when the 3D surface of the object is itself planar, the planar fan of light intersects it along a segment of a true line. However, when the 3D surface of the object is curved, the planar fan of light intersects it along a curve indicative of the profile of the curved surface. The planar fan to be projected by the laser DS system onto the object can include at least one laser fan formed, e.g., by passing a laser beam through an aspherical lens (such as a Powell lens) or another appropriate generator including cylinder lenses, holographic, cylinder arrays, linear diffusers, or combinations thereof). A camera sensor of the laser DS system receives, along a camera axis that is not parallel to the axis of the planar fan, light reflected off a portion of the 3D surface corresponding to the illumination contour. The laser DS system uses the light received from the illumination line, referred to as line light, to image the illumination line on the camera sensor, and a processor associated with the laser DS system thereby triangulates on the 3D surface's profile based on an image of the illumination line. However, the lumpy and asymmetric irregularity of the received line light, as a result of speckle, limits the precision of the location of the illumination line image on the camera sensor. The lumpiness in the illumination line image and asymmetry perpendicular to the line direction is read as an error in height of the 3D surface. The reduction of speckle enables a lower uncertainty and higher accuracy measurement of profile by the laser DS system.

There are several available techniques for reducing speckle. For example, a moving diffuser can be placed within the path of a stationary beam, causing an incoherent superposition of random speckles fills in the image of the line with the average of several uncorrelated speckle patterns. Disadvantageously, the diffuser spreads the beam in a direction that deteriorates the quality of the line profile and the diffuser tends to be a relatively high in mass (compared to the scale of other components), and moving it requires mechanical complexity and can limit the rate of change of the speckle pattern, and hence, the frame rate of the system. Other approaches for reducing speckle (including wavelength broadening) are also disadvantageous to varying extents, involving added cost, complexity and/or other disadvantages. Thus, such approaches are less desirable to employ in a practical laser line-projecting arrangement.

It can also be challenging to accurately scan an object using a planar fan of diffused light. In general, many scanning arrangements rely upon the object, the camera and/or the illuminator to move as motion is tracked and translated into relative distance within the vision system processor. This requires mechanical systems that can be subject to wear and degradation due to (e.g.) conditions in the scanning environment.

SUMMARY

The disclosed technologies overcome disadvantages of prior art by providing a coherent light (laser) beam that moves (e.g. laterally), in a (e.g.) cyclic manner, across a stationary linear diffuser (e.g. an engineered linear diffuser with a flat top intensity profile, hologram or other diffractive element, and/or cylinder array). This allows the local phase of an illumination line, which is formed where a planar fan of diffused light projected through the diffuser onto a 3D surface intersects the 3D surface, to change significantly faster, as a relatively small mass is cycled to redirect the beam using a moving mirror structure. For example, a MEMS mirror, or another arrangement that is free of a moving mass, such as solid state beam deflector (e.g. an AOM) can be used as the moving structure. This arrangement allows for relatively short exposure times since the projected phase, and thus, imaged speckle pattern varies at a high rate relative to the exposure times. The use of a linear diffuser allows for a high quality planar fan that is generally free of diffusion and/or broadening (in thickness) in the direction substantially perpendicular to the planar fan's axis (the planar fan's thickness). In an embodiment in which an image sensor is employed, such as a DS, the beam is moved at a speed of at least ½ cycle (left-right) per image frame so that the full length of the illumination line within the imaged scene is captured by the image sensor. The addition of a field lens to maintain the illumination line, which is generated by the diffuser by projecting a planar fan of diffused light onto a working surface, substantially stationary on the surface reduces frame to frame and intraline variation of illumination-line intensity that would result from a partial scan of less than or more than one-half (½) cycle. Operationally, the distance traversed on the diffuser provides sufficient uncorrelated speckle patterns within an exposure time to significantly average to a smooth illumination line and reduce the speckle contrast. In further embodiments, a mirror assembly (e.g. MEMS) having two degrees of freedom can be employed with the above-described arrangement to generate the planar fan along a first direction and scan the object surface along a second (orthogonal) direction. The first direction is generally scanned at a high frequency while the second direction is scanned at a slower frequency.

In an illustrative embodiment, a system and method for generating an illumination line on a working 3D surface with reduced speckle includes an (e.g. oscillating) laser source in the form of a collimated beam and a linear diffuser that receives at least a portion of the moving collimated beam, forms a planar fan from the light passing therethrough, and projects the planar fan of diffused light onto the 3D working surface to form an illumination line at the intersection of the planar fan with the 3D working surface. A moving element moves the collimated beam in a sweeping (e.g.) cyclic motion substantially within at least one plane. Illustratively, the laser source can comprise a stationary laser beam source and a (e.g.) cyclically moving beam deflector that is driven by the moving element. By way of non-limiting example, the beam deflector can comprise a MEMS mirror. The beam deflector can alternatively be driven by another mechanism, such as a galvanometer, or the beam deflector can be a solid state unit, such as an AOM. In another embodiment the linear diffuser is moved by the moving element so that the collimated beam is formed into a line by a combination of the optics of the diffuser and its oscillatory motion. The arrangement can also have a field lens located between the oscillating laser source and the linear diffuser or immediately after the linear diffuser, and the field lens can be unitary with the linear diffuser—for example, defined in a hologram that also provides a linear diffuser function. The MEMS mirror can be arranged to oscillate in each of two degrees of freedom that are substantially orthogonal so that the planar fan is generated along a first (fast) scan direction and the planar fan moves along the working surface in a second (slow) scan direction. In various embodiments, the planar fan generation device can be adapted/used to comprise/construct a laser displacement sensor (DS). The DS can be operatively connected to a vision system processor. In embodiments, the planar fan generation device can comprise an optical component having at least one of an engineered linear diffuser, a hologram and a cylinder array, and can be arranged to project the planar fan in a non-continuous pattern. This non-continuous pattern can define at least one of dots, and line segments separated by non-illuminated gaps, or other appropriate patterns. In embodiments, light is captured from at least a portion of the illumination line, which is formed by the planar fan projected on the working surface with a sensor. The sensor then generates image data from the captured light. The image data can be processed/used to perform a measurement and/or inspection on a region of the working surface. The working surface can define at least a portion of an object to be measured.

In another embodiment, a system and method for reducing at least one of speckle effect and sparkle effect in an illumination line projected on a surface is provided. The system and method employ a collimated light source, and an optical component that generates a fan of light within one or more predetermined angles on each side of a central optical axis. A linear diffuser, through which the beam or fan passes, is located between the optical component and the surface. The optical component can comprise at least one of a MEMS mirror, a solid state deflector and a Powell lens and the collimated light source is a laser.

In another embodiment, a system and method for scanning a surface to determine a 3D profile, which advantageously allows the profiler and the object to remain relatively stationary during scanning, is provided. A vision system camera is arranged to image the surface along an optical axis thereof. A collimated light source is also provided, remote from, and arranged to, project a beam at a non-parallel angle with respect to the optical axis. A MEMS mirror receives the beam from the collimated light source and projects it onto the surface at a non-parallel angle with respect to the optical axis. A mirror controller drives/oscillates the MEMS mirror in at least two orthogonal degrees of freedom so as to (a) generate a fan of light along a first direction within one or more predetermined angles on each side of a central optical axis and (b) move the fan along a second direction to cause the fan to scan a surface. A linear diffuser, through which the fan passes, is located between the MEMS mirror and the surface. Illustratively, a polarizing beam splitter and ¼ $\lambda$, optical retarder is located along the optical path of the collimated light source. A cylindrical lens can be provided within the optical path. The mirror controller is arranged to oscillate the MEMS mirror at a first rate in the first direction and a second rate, slower than the first rate, in the second direction. The vision system camera can include an image sensor with a first optical plane and a lens assembly with a second optical plane that is non-parallel to the first optical plane. Each of the first optical plane and the second optical plane may be oriented to adhere to the Scheimpflug principle with respect to a plane defined by the fan.

In another aspect, the disclosed technologies can be implemented as an illumination apparatus for reducing speckle effect in light reflected off an illumination target. The system includes a light source configured to emit coherent light; a linear diffuser positioned in an optical path between an illumination target and the light source, the linear diffuser being configured to diffuse the coherent light into diffused light that spreads in one dimension across at least a portion of the illumination target, which has an associated exposure time for illumination of the illumination target by the diffused light. Here, the diffused light forms a planar fan of light that is generally free of broadening in a direction perpendicular to the one dimension. The system further includes a beam deflector positioned between the light source and the linear diffuser on the optical path; and a controller coupled with the beam deflector. The controller is configured to operate the beam deflector to direct the coherent light incident on the beam deflector to sweep across different locations on the linear diffuser within the exposure time for illumination of the illumination target by the diffused light. Additionally, the different locations span a distance across the linear diffuser that provides sufficient uncorrelated speckle patterns at an image sensor in light reflected from an intersection of the planar fan of light with the illumination target to add incoherently when imaged by the image sensor within the exposure time for illumination of the illumination target by the diffused light.

The foregoing and other embodiments can each optionally include one or more of the following features, alone or in combination. In some implementations, the light source can include a laser. In some implementations, the beam deflector can include a microelectromechanical system (MEMS) mirror. In some implementations, the beam deflector can include an acousto-optic modulator (AOM) device.

In some implementations, the system can include a cylinder lens positioned in the optical path between the linear diffuser and the beam deflector to operate as a field lens to increase efficiency by concentrating all of the coherent light is directed to the linear diffuser. In some implementations, the system can include a cylinder lens, where the linear diffuser is positioned between the beam deflector and the cylinder lens, and where the cylinder lens is configured to operate as a field lens to increase efficiency by concentrating all of the diffused light directed to the illumination target.

In some implementations, the linear diffuser can include an engineered diffuser with a flat top intensity profile along the one dimension. In some implementations, the linear diffuser can include a chirped diffraction grating with a Free Spectral Range (FSR) that causes diffracted line spacing in the planar fan of light to change with a sweep angle of the coherent light incident on the linear diffuser. In some implementations, the linear diffuser can include a hologram or a cylinder array.

In some implementations, the linear diffuser is stationary with respect to a base portion of the beam deflector. Here, the controller is configured to operate the beam deflector to direct the coherent light in a cycling left-right-left sweep with respect to the linear diffuser, such that the coherent light is directed through either the left-right half or the right-left half of the left-right-left sweep within the exposure time for the illumination of the illumination target by the diffused light.

In another aspect, the disclosed technologies can be implemented as a laser displacement measuring system. The system includes a vision system processor; a camera assembly coupled with the vision system processor; a laser beam assembly coupled with the vision system processor, the laser beam assembly configured to emit coherent light; a beam deflector positioned to receive the coherent light; a controller coupled with the beam deflector; and a linear diffuser positioned in an optical path between an illumination target and the beam deflector. The controller is configured to operate the beam deflector to direct the coherent light incident on the beam deflector to sweep across different locations on the linear diffuser. The linear diffuser is configured to diffuse the coherent light, received from the beam deflector at the different locations, into diffused light that spreads in one dimension across at least a portion of the illumination target, which has an associated exposure time for illumination of the illumination target by the diffused light, where the diffused light forms a planar fan of light that is generally free of broadening in a direction perpendicular to the one dimension. Additionally, the different locations span a distance across the linear diffuser that provides sufficient uncorrelated speckle patterns at an image sensor in light reflected from an intersection of the planar fan of light with the illumination target to add incoherently when imaged by the image sensor within the exposure time for illumination of the illumination target by the diffused light.

The foregoing and other embodiments can each optionally include one or more of the following features, alone or in combination. In some implementations, the linear diffuser is stationary with respect to a base portion of the beam deflector. Here, the controller is configured to operate the beam deflector to direct the coherent light in a cycling left-right-left sweep with respect to the linear diffuser, and the controller is configured to operate the beam deflector to direct the coherent light through either the left-right half or the right-left half of the left-right-left sweep within the exposure time for the illumination of the illumination target by the diffused light.

In some implementations, the linear diffuser can include an engineered diffuser with a flat top intensity profile along the one dimension. In some implementations, the linear diffuser can include a cylinder array. In some implementations, the linear diffuser can include a hologram. Here, the hologram is configured to project the planar fan of light onto the illumination target in a non-continuous pattern. For instance, the non-continuous pattern can include at least one of dots, and line segments separated by non-illuminated gaps. In some implementations, the linear diffuser can include a chirped diffraction grating with a Free Spectral Range (FSR) that causes diffracted line spacing in the planar fan of light to change with a sweep angle of the coherent light incident on the linear diffuser.

In some implementations, the beam deflector can include a microelectromechanical system (MEMS) mirror. In some implementations, the beam deflector can include an acousto-optic modulator (AOM) device.

In some implementations, the system can include a cylinder lens positioned in the optical path between the linear diffuser and the beam deflector, and configured to operate as a field lens to increase efficiency by concentrating all of the coherent light is directed to the linear diffuser. In some implementations, the system can include a cylinder lens such that the linear diffuser is positioned between the beam deflector and the cylinder lens. Here, the cylinder lens is configured to operate as a field lens to increase efficiency by concentrating all of the diffused light directed to the illumination target.

In some implementations, the laser beam assembly can include a laser.

In some implementations, the camera assembly is configured to capture light reflected from the intersection of the planar fan of light with the illumination target, and generate image data from the captured light. Here, the vision system processor is configured to receive the image data from the camera assembly, and process the image data to perform at least one of measurement and inspection on a region of the illumination target. In some implementations, the camera assembly can include an image sensor with a first optical plane and a lens assembly with a second optical plane that is non-parallel to the first optical plane, each oriented to adhere to the Scheimpflug principle with respect to the planar fan of light.

BRIEF DESCRIPTION OF THE DRAWINGS

The description below refers to the accompanying drawings, of which.

DETAILED DESCRIPTION

I. Vision System Implementation

Figure 1:
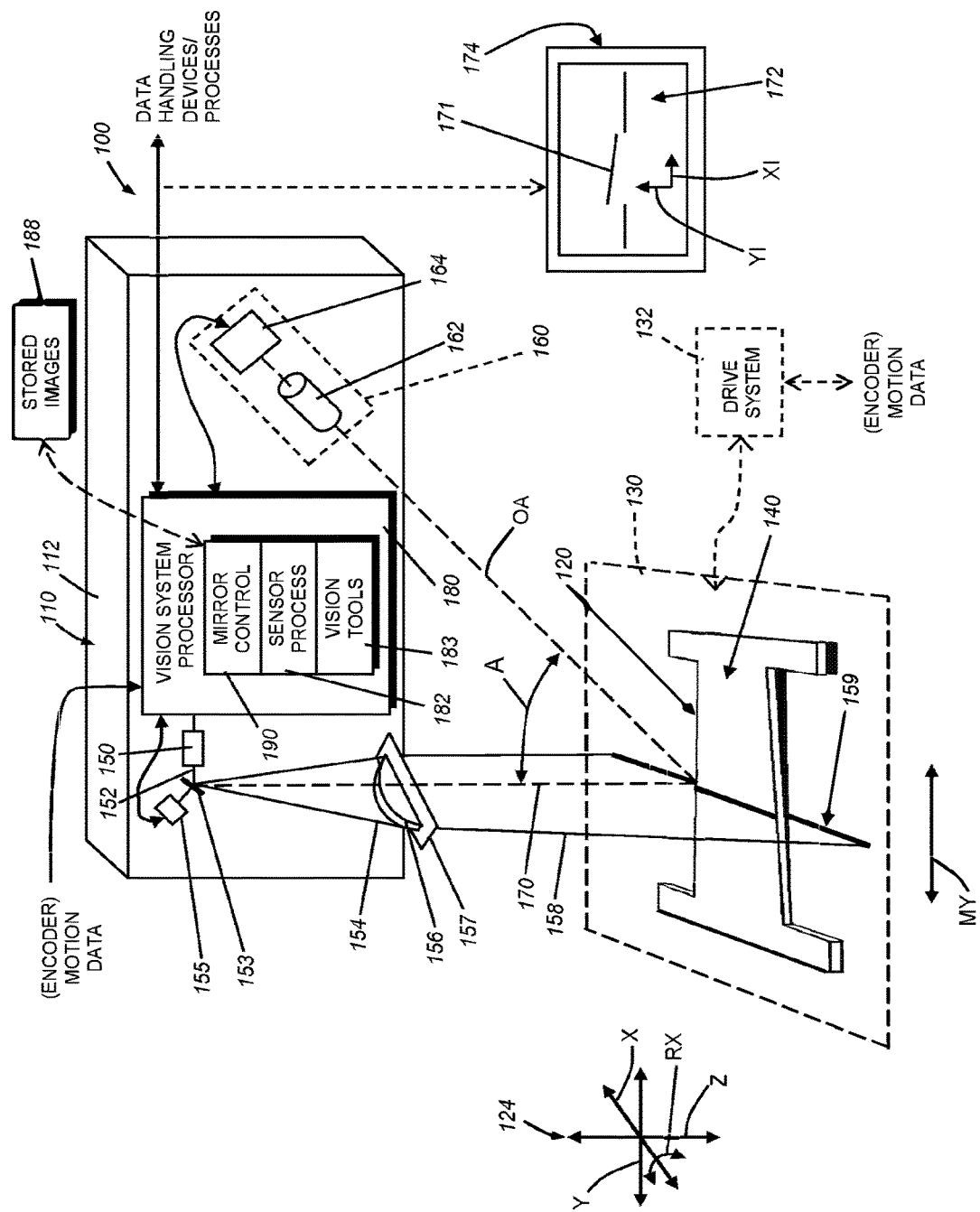
FIG. 1 is a schematic perspective view of a laser displacement sensor (DS) system acquiring an image of an object as relative motion occurs therebetween in a scanning direction, employing a speckle reduction system according to an exemplary embodiment.

By way of non-limiting example, FIG. 1 shows an example of a vision system 100 including a laser displacement sensor (DS) assembly 110 oriented to image an object 120 (also sometimes referred to as a "part"). The DS assembly 110 can be contained in a single housing 112 that is mounted at an appropriate location with respect to the imaged scene. In alternate embodiments, the displacement sensor can comprise discrete, separated subcomponents. In an exemplary implementation, the object 120 and the displacement sensor 110 are in relative motion (double arrow MY) with either the displacement sensor 110, the object 120, or both, moving (the scan motion direction) along at least one axis of the relative coordinate system 124 (in this example, the physical y-axis direction). In a typical arrangement, the object 120 is located on a motion conveyance 130 (shown in phantom) that provides motion data from an encoder or similar device operatively connected to the motion drive system 132 in a manner clear to those of skill in the art.

Also, as described further below, the system and method can be employed on images that are acquired and then stored for further processing. Such images can be transmitted for processing by the system and method (i.e. a filtering process and associated vision system tools) in a manner in which the processor is free of connection to the camera assembly or other image acquisition arrangement.

The object 120 is, by way of example, a structure having a surface 140 that defines a generally three-dimensional (3D) profile, in which (e.g.) the height (i.e. the displacement dimension along the physical z axis) varies with respect to the x-axis and y-axis directions. This is only one example of a wide range of possible surface shapes, and is described as a useful example of the principles of the illustrative embodiment of the system and method. In further examples the outer, surrounding surface can define a more complex perimeter with different/additional features.

The DS assembly 110 includes a laser beam assembly 150 that projects a coherent beam 152. The beam 152 is directed to a moving beam deflector (e.g. a mirror—described in further detail below) 153 which, in this embodiment turns the central axis (dashed line 170) of the beam generally 90 degrees. Note that the depicted 90-degree (right) angle is exemplary, and the angle of beam deflection can vary widely depending upon the configuration of the system and other desired design criteria. The deflector 153 includes a drive or other mechanism (including a solid state arrangement as described below) 155 that causes the deflector to reflect the beam in a lateral, cycling pattern (e.g. left-right). In an embodiment the drive 155 can cause the deflector to pivot on an axis between a +/− angle. The reflected beam cycles left-right so as to trace out a sweeping fan 154 centered around the fan axis 170. This beam of the fan passes into an optical structure that includes a cylinder lens 156 and a linear diffuser 157. The lens (optional in various embodiments) redirects the planar fan 158 toward the object 120 and surrounding scene in a desired configuration. As described in detail below, the diffuser 157 and moving deflector 153 generate a planar fan of diffused light 158 having substantially Gaussian beam limited out-of-plane thickness and intersecting the scene to be imaged (e.g., here, the object 120 and the motion conveyance 130) along an illumination contour 159, such that the illumination contour is effectively speckle free and has an effectively uniform thickness regardless of an in-plane displacement of the illumination contour.

As shown, the illumination contour, also referred to as the illumination line, 159 is defined along the physical x-axis (transverse to the scan motion direction MY). The planar fan 158, in this embodiment, is approximately (or substantially) perpendicular to a reference plane, such as the physical x-y plane of the motion conveyance 130 and/or a plane of the surface 140 of the object 120. The displacement sensor assembly 110 also includes a camera assembly (dashed box 160) consisting generally of a lens/optics assembly 162 potentially arranged in a well-known Scheimpflug configuration (or any other appropriate optical arrangement that should be clear to those of skill) and an image sensor assembly 164. The image sensor assembly 164 contains an array of photosensitive pixels defining a predetermined resolution, and the camera assembly 160 generally defines an optical axis OA that intersects the object 120 in the region of the illumination line 159. The camera optical axis OA defines a non-parallel (e.g. acute) angle A with respect to the plane (and associated axis 170) of the planar fan 158. Thus, any physical z-axis height variation/displacement in the illumination line 159 along the physical x-axis is imaged by the camera assembly 160 as a variation in position (along the image axis YI) in the resulting line 171 of a two-dimensional (2D) image 172 as shown generally in the exemplary (and optional) user interface display 174.

Note that the depicted arrangement of axes (x, y, z) is a convention, and other representations of relative orientation (e.g. polar coordinates) are expressly contemplated. As shown, rotation about a given axis is also represented, for example by the double-curved arrow Rx, which depicts rotation about the physical x-axis.

The image sensor 164 is operatively interconnected to a vision system processor 180 that is contained within the housing 112 of the displacement sensor 110 in this embodiment. In alternate embodiments, some or all of the vision system processor components and/or processes can reside remote from the housing (on an interconnected tablet, laptop or PC that can be associated with the display 172, for example). The vision system processor 180 performs a displacement sensor process 182 in accordance with the illustrative embodiment described in detail further below. The processor 180 may also receive relative motion signals from the motion conveyance 130 or another moving device (e.g. a gantry or manipulator holding the displacement sensor and/or the object). Images are acquired in association with such motion signals so that the illumination line 159 is registered with the physical position in the scene. Images can be stored in an appropriate memory or storage location 188 for subsequent transmission and/or analysis. Note that the use of a DS assembly with relative motion versus the object under inspection is exemplary of a wide range of applications in which the line-generation system of this embodiment can be employed. For example, a DS assembly of the type depicted can be employed in a static configuration in various applications—for example to generate static line profiles or cross sections on objects that are stationary (free of relative motion). The reduced-speckle line generated by the illustrative embodiment is beneficial in increasing the accuracy of such measurements.

The DS assembly 110, or another device, can include/incorporate appropriate vision system tools and processes (ors) 183, such as edge detectors, line finders, blob analyzers, calipers, etc. These tools and processes(ors) 183 analyze 3D images provided by the sensor assembly 164, and generate results based upon such analysis. By way of non-limiting example, image data (i.e. a range image or 3D point cloud) and/or analyzed results is/are transmitted to downstream data handling devices and processes for use in various production activities, such as inspection, quality control, object manipulation, assembly, etc.

The processor 180, or another module, can include a mirror/deflector control process(or) 190, which is interconnected to the beam deflector driver 155. This control 190 operates the deflector at an appropriate cycle rate (frequency), and can be based on the acquisition frame rate of the sensor assembly so as to ensure that each frame images a sequence of instances of the illumination line 159 corresponding to a complete trace of the beam 152 on the linear diffuser 157.

II. Generalized De-Speckled Beam Arrangement

Figure 3:
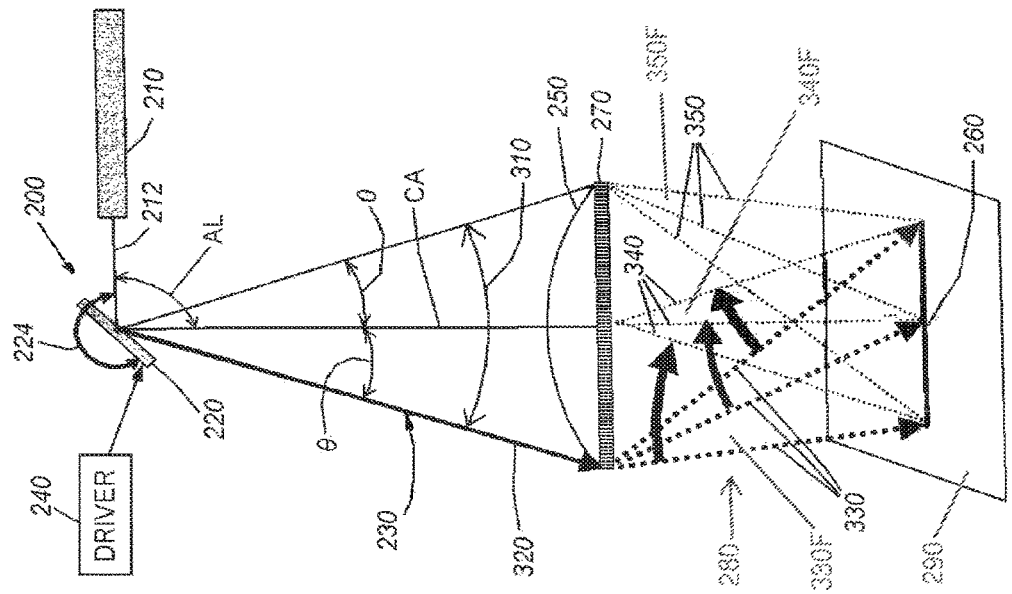
FIG. 3 is a front oriented view of the laser line generator of FIG. 2.
Figure 2:
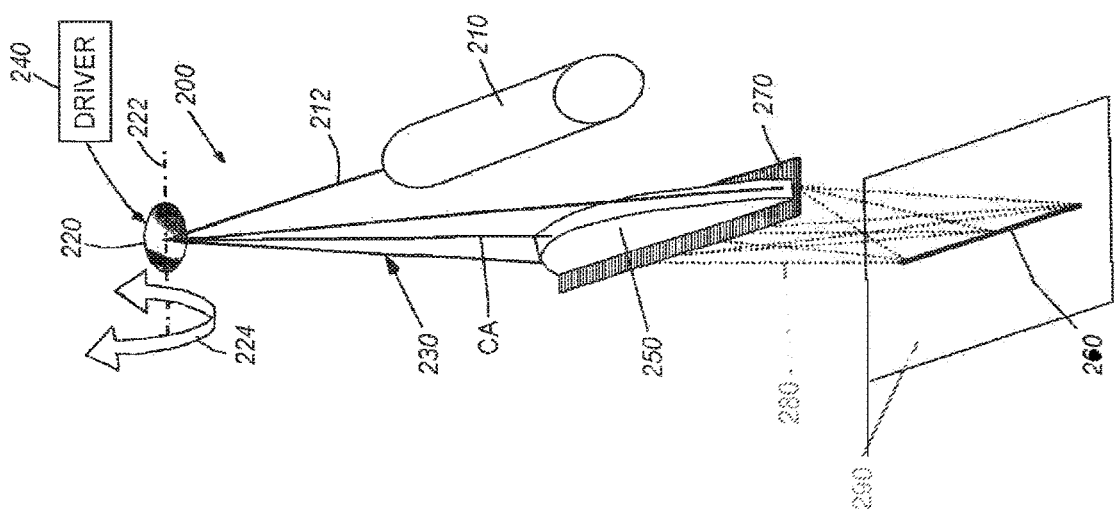
FIG. 2 is a side-oriented perspective view of a laser line generator with a speckle reduction (de-speckling) arrangement according to the exemplary embodiment of FIG. 1.

While the above-described DS embodiment provides a particular implementation in which a de-speckled line can be used advantageously to produce vision system results, the beam generation arrangement can be employed in any of a variety of applications, including range finders, 3D topology scanning systems, laser levels, other forms of triangulation systems, etc. FIGS. 2 and 3 depict a generalized arrangement for a laser line generation system 200 that is adapted to de-speckle an illumination line 260 for greater accuracy and consistency of line displacement measurements.

As depicted, the generator 200 includes a laser 210 of appropriate power output and wavelength. The laser 210 can be a solid state, diode-based device or another appropriate unit with a relatively compact design and form factor. Inherently, the laser projects a collimated beam 212 of light that is temporally and spatially coherent in any appropriate wavelength (including near-visible UV and IR).

The input beam 212 is directed along an input path to a beam deflector (any form of mirror/reflecting surface or solid state sweep generator) 220 that deflects all, or nearly all, of the beam 212 into an output path shown centered about an axis CA. Illustratively, the axis CA of the output path is oriented at an angle AL that is 90 degrees (right angle) with respect to the input beam 212. The angle AL is highly variable in alternate implementations. The beam deflector moves in a reciprocating (e.g. rotational) motion along one axis. The beam deflector 220 can comprise any mechanical or solid state mechanism for diverting the reflected path of the beam from the central axis CA. Illustratively, the beam deflector 220 can be a microelectromechanical system (MEMS) mirror, galvanometer mirror, acousto-optic modulator (AOM), or other device or material including Lithium Niobate (LiNIBO3) or anything that generates a sweep (double arrow 310 in FIG. 3) of the reflected, output beam (shown at one end of the sweeping fan 230 as ray 320) into a planar, sweeping fan 230.

In this embodiment, the sweep (represented by double-curved arrow 224) of the beam deflector 220 is oriented about the pivot axis 222 that is centered on the input beam 212. A driving circuit and/or mechanism 240 is operably connected to the deflector 220. The driver should be a circuit and/or mechanism that is appropriate to the technology used to implement to deflector—which should be clear to those of skill. As described below, the driver and deflector are collectively capable of cycling the beam sweep and resulting beam trace (into sweeping fan 230) at a rate and amplitude (left-right) that is high enough to provide a sufficiently random speckle pattern of the illumination line 260 within one exposure time (e.g. one acquired image frame), so that the speckles in the imaged pattern average-out visibly to a smooth line. For example, the beam 320 is moved at a speed of at least ½ cycle (of the left-right-left cycle 310) per image frame so that an image of the full length of the illumination line 260 within the imaged scene 290 (or 130+140) is captured by an image sensor (e.g., 160). If shorter scans are being used, e.g., ¼ cycle (of the left-right-left cycle 310, e.g., left-center, center-right, etc.) per image frame, then the quality of the speckle averaging is reduced. For instance, the quality of speckle averaging for the above-noted ¼ cycle scan will be 71%

$$\left(\text{or } \frac{1}{\sqrt{2}}\right)$$

of the quality of speckle averaging for the above-noted ½ cycle scan.

The system 200 also includes and optional cylinder lens 250 or similar optical structure. It operates as a field lens to increase efficiency by concentrating all of the light from the sweeping beam 320. The lens 250 renders the entire length of the resulting illumination line 260 more uniform at an object 290 to be imaged in terms of illumination intensity and speckle averaging. As the lens 250 is optional, it can be omitted in alternate embodiments. In alternate embodiments, the lens function can be built into a hologram or engineered into a line generator. As described further below, a "line generator" is used herein to refer to a linear diffuser (e.g., an engineered linear diffuser with specified intensity profile, hologram, chirped diffraction grating, and/or cylinder array, designed to diffuse incident light into diffused light that spreads in only one dimension) or a linear diffuser in combination with (e.g., integrated with) other components that assist in forming a planar fan of light.

The system 200 includes a line generator 270, which can comprise a linear diffuser of conventional or custom design. The line generator 270 is illustratively implemented as an engineered diffuser with a flat top intensity profile. It is adapted to diffuse predominantly in one direction (typically aligned with the direction of the illumination line 260), or as contemplated in this embodiment, in only one direction. By way of non-limiting example, a linear diffuser is available from RPC Photonics, Inc. of Rochester, NY as an Engineered Diffuser™ Line (EDL) of appropriate parameters. For example, model EDL-40-A defines a line spread of +/−20 degrees with relative constant (flat top) intensity within this angle range, and rapid fall off to zero intensity on either side of the flat top. The scatter by the linear diffuser is relatively uniform along the included angle. Other models allow a lesser or greater line spread angle (for example up to +/−60 degrees-120 total degrees). Notably, the diffuser scatter is exclusively along one degree of freedom and virtually no scatter occurs transverse to that one degree. This ensures no thickening/broadening of the illumination line 260 and that the thickness of fan of light perpendicular to the plane of the fan is substantially equal to the Gaussian profile of the laser used. It should be noted that if a laser beam were stationary at the linear diffuser 270 (engineered, holographic, or otherwise), then the linear diffuser will produce substantial objective speckle on the object 290 as well as other diffractive and refractive artifacts detrimental to the uniformity of the illumination profile 260, all of which being stationary and similar in appearance for all observers. In contrast, subjective speckle—the main subject of the disclosed technologies—varies for different observer apertures and locations. The sweep 310 of the beam 320 across the diffuser 270 averages this objective speckle and the other artifacts (i) to a uniform intensity profile in the illumination line direction at the object 290 being imaged, and (ii) to a beam profile that is substantially equal to the original laser beam 212's profile perpendicular to the sweep direction and that profile will be constant in the sweep direction.

In alternate embodiments, the line generator 270 can comprise a holographic diffuser or another type of diffuser that causes the beam passing therethrough to divide into multiple beams along the predominant direction (line 260). This is represented by the beam 320 in FIG. 3, which is broken by the line generator 270 into multiple beams 330 distributed along at least a portion of the working section (e.g., length of the illumination line 260). In the example illustrated in FIGS. 2-3, a combination of the lens 250 and the line generator 270 is arranged and configured such that the multiple beams 330 form a fan-shaped diffused-light pattern 330F, which intersects the object 290 along a first instance of the illumination line 260. As the beam 310 sweeps through its path, the pattern continues, as represented by beams 340 and 350. For example, the beams 340 form another fan-shaped diffused-light pattern 340F, which intersects the object 290 along another instance of the illumination line 260, and the beams 350 form yet another fan-shaped diffused-light pattern 350F, which intersects the object along yet another instance of the illumination line. This effect serves to average the speckle within the diffuser-generated instances of the illumination line 260, and produces a consistent and accurate cumulative image of the illumination line 260. In other words, all points of the imaged instances of the illumination line 260 add incoherently over an exposure interval (e.g. an image frame) to form a visual of the complete line.

The sweep angle θ of the sweeping fan 230 on either side of the axis CA is highly variable and can be based (in part) upon the size of the line generator 270, and sweep angle 224 of the beam deflector 220. By way of non-limiting example, the angle θ can range between 20 and 30 degrees (e.g. in a MEMS implementation), and the illumination line 260 can define a working section (length) of approximately 1 meter. By way of further example, the mirror surface of the beam deflector (e.g. in a MEMS implementation) 220 can define a diameter of approximately 1.0 millimeters. Illustratively, the MEMS can be set to operate at its natural frequency. By way of example the natural frequency of such a MEMS mirror can be in the range of approximately 20 KHz. It should be noted that MEMS implementations can be manufactured according to a user's specifications by an appropriate fabricator in a manner clear to those of skill.

While a driven or solid state beam deflector is shown and described, it is contemplated that the beam source can be cyclically driven or deflected via (e.g.) an in-line component (e.g. a prismatic and/or refractive structure). For example, a voice coil can be incorporated into the laser diode, causing it to oscillate along the degree of freedom. Thus, it is contemplated generally that a beam source can provide a cyclically oscillating beam 320 along one degree or dimension to generate a sweeping fan 230. This oscillating beam 320 is passed through the line generator 270, wherein it is spread out to the included angle of the line generator via its inherent scatter along the degree of freedom to form a planar fan 280 as a sequence of fan-shaped diffused-light patterns 330F, . . . , 340F, . . . , 350F.

Figure 4:
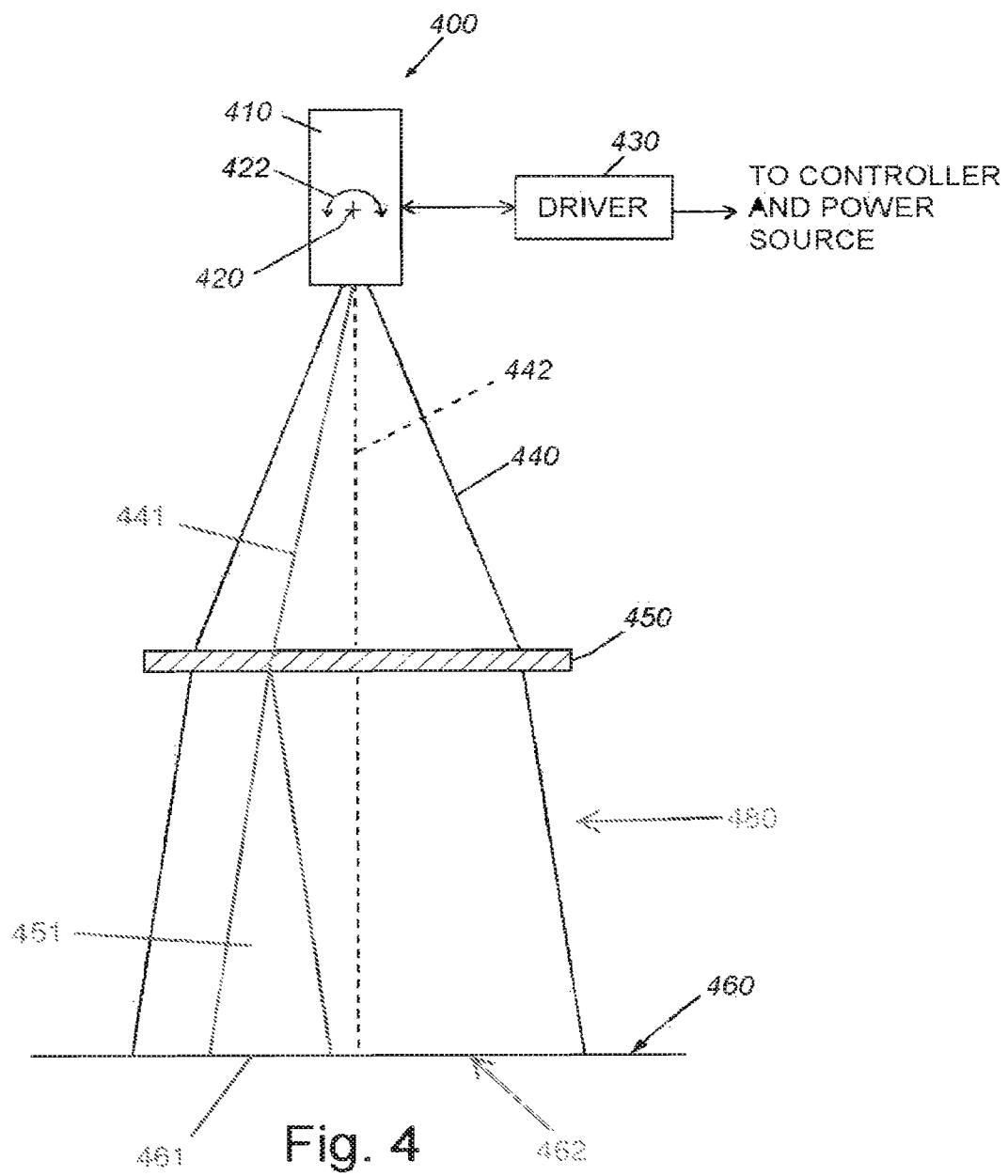
FIG. 4 is a diagram showing a moving laser (beam source) that transmits a cyclically oscillating beam into a laser line generator.

FIG. 4 depicts an arrangement 400 in which the laser 410 is driven about an axis 420 in a cyclically oscillating manner (double curved arrow 422) by an appropriate driver circuit or control 430. The laser 410, which emits a collimated beam 441, can be mounted on a flexure, voice coil or similar component that allows it to move the collimated beam along a degree of freedom so as to trace a planar (sweeping fan) pattern 440 relative to a central axis 442. In another embodiment, an inline optical component of the laser, such as a prism and/or lens can be mounted so as to move the collimated beam 441 in a cyclic manner. The oscillating beam 441, which traces the planar pattern 440, is transmitted through a line generator 450. As described herein a "line generator" is used to refer to a linear diffuser (designed to diffuse incident light into diffused light that spreads in only one dimension) or a linear diffuser in combination with (e.g., integrated with) other components that assist in forming a planar fan of light. The beam 441 is thereby scattered along one degree of freedom, and forms a respective instance of a fan-shaped diffused-light pattern 451, which is projected onto the working surface 460 as a line segment 461. A sequence of overlapping instances of the line segment 461, which is produced as the beam 441 traces the planar pattern 440, results in a speckle-reduced line 462. Here, the speckle-reduced line 462 represents the intersection of a planar fan of diffused light 480, which is produced as sequence of overlapping instances of the fan-shaped diffused-light pattern 451 with the working surface 460. A field lens or other focusing structure can be included in line between the laser 410 and the line generator 450, or can be formed into the line generator. In alternate embodiments, the lens can be omitted. The term "oscillating laser source" should be taken broadly to include a moving laser and/or inline optical component of the laser or a laser with a beam deflector as described above—or combinations of such components.

III. Distances and Component Positioning

It should be clear that the above-described components of the line generation system 200 or 400 (laser, beam deflector or other mechanism for causing the beam to cyclically oscillate, optional lens and line generator) can be variously combined into one or more housings/enclosures in a precise and stable interrelationship in a manner that provides a desired form factor and functionality for the desired task. Enclosures can be constructed of any appropriate material including polymers, such as polycarbonate, acrylic, etc. or metals, such as aluminum alloy, steel, magnesium alloy, etc. Distance between components and size can be based on working section corresponding to the length of the illumination line and working distance from the beam generator 270 or 450 to the working surface, in a manner clear to those of skill.

Figure 5:
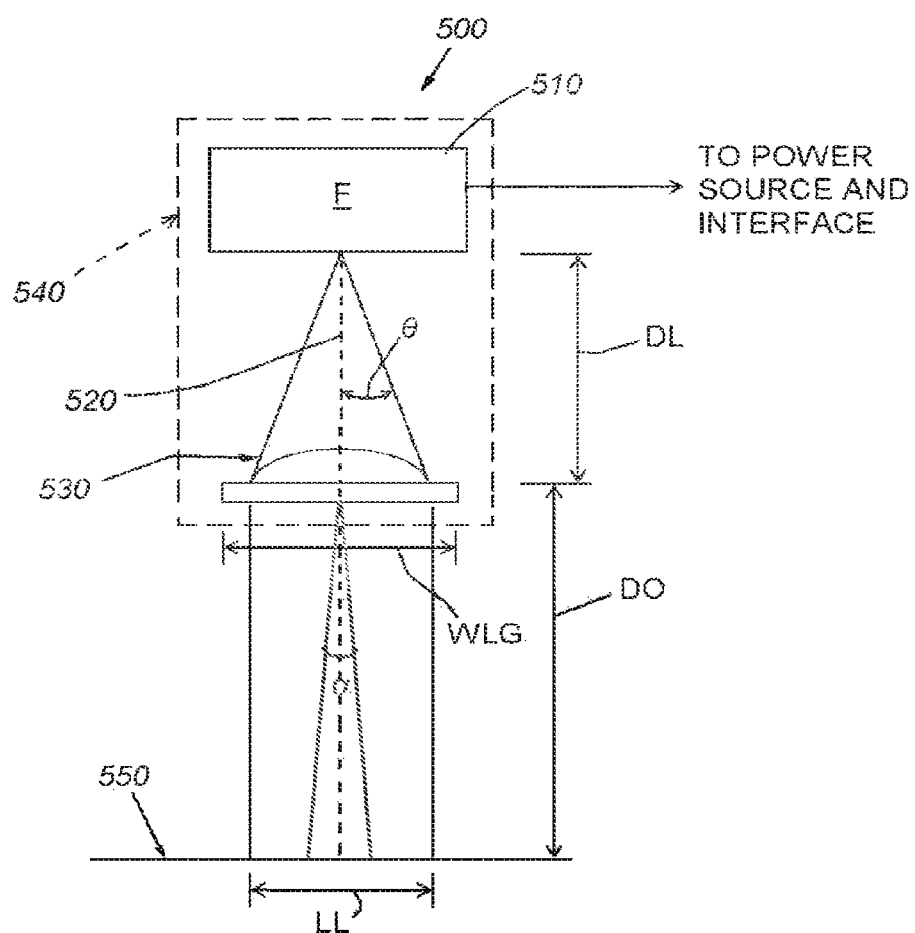
FIG. 5 is a diagram showing the relative relationship between the components of the line generator system and the working surface upon which a line is projected.

FIG. 5 shows a diagram of an example of a line generation system 500 in which the laser and beam deflector (or more generally, an oscillating laser source) are contained in a single unit (e.g. a circuit board) 510, which is interconnected to a power source. The laser provides a sweep of +/−θ degrees with respect to the center axis 520 at a predetermined frequency F, which can be variable based on communication between the system controller and an associated interface. The oscillating laser source 510 is spaced at a distance DL from the (optional) cylinder lens and line generator (linear diffuser) assembly 530. The values for θ and DL dictate the required minimum width WLG of the assembly 530, that is, WLG=2 tan θ*DL. The (optional) lens and line generator assembly 530 can be separate or can be combined with the laser source 510 in a single housing (dashed box 540). Note that the lens and line generator can be separated from each other along the axis 520 in alternate embodiments. In general, the working distance DO between the line generator and the working surface 550 can vary depending upon the application, as well as the desired maximum length LL of the illumination line and geometry of the lens and line generator assembly 530. The length LL can also be defined based upon the included angle of scatter a inherent in the line generator along the degree of freedom as shown. For example, for a desired maximum length LL=100 mm, and a working distance DO=300 mm, the line generation system 500 can be designed to include (i) a beam deflector, such as a MEMS mirror, having a resonant frequency of 20 kHz and an optical scan angle θ of +/−15 degrees, and (ii) a laser (e.g., 150, 210) with a beam waist diameter 500 microns $1/e^2$ in the sweep direction. Here, a line generator assembly 530 having a minimum width WLG=10 mm is separated from the laser source 510 by a distance DL sufficient for the beam deflector (e.g., 153 or 220) to sweep the laser beam the distance WLG. If the beam deflector sweeps an included angle (2θ) of 30° and a WLG of 20 mm is desired for a scan at the linear diffuser 530 of 40 beam diameters, then a distance DL=))(WLG/2)/(tan (15°=37 mm is required. Further here, the laser beam is to be swept at a frequency F (e.g., 20 kHz), when the minimum acquisition time (e.g., exposure time) for maximum speckle reduction is half to full cycle period (e.g., 50 μs in this case) of the MEMS mirror or Δt=25 μs. The diffuser full scatter angle α is chosen such that a diffused beam formed by the linear diffuser 530 from a stationary laser beam will illuminate at least the full line length LL at working distance DO. In the above example, α=2*(atan((LL/2)/DO))=18.9°. A linear diffuser 530 of at least a 20° scatter angle would be sufficient. If no field lens is used, this angle should be doubled to ensure continuous illumination and maximum speckle reduction. If a field lens is used and placed adjacent to the linear diffuser, its design is simply a cylinder lens with a focal length (f) calculated by the conjugates $s_1$=DL=37 mm and $s_2$=DO=300 mm. The lens equation (1/s1+1/s2=1/f) is used to calculate the focal length. In this case, f=32.9 mm and the lens length is approximately the same as the diffuser length WLG.

IV. Optical Effects

Figure 6:
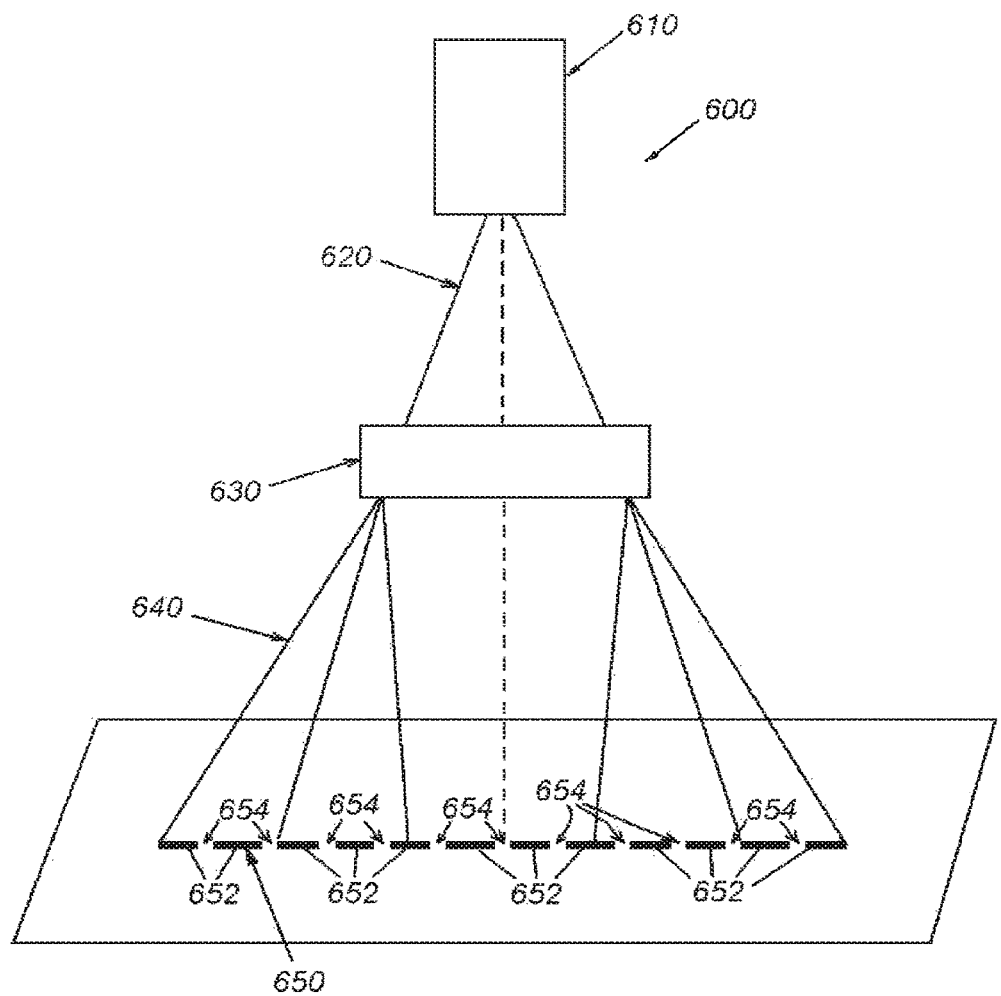
FIG. 6 is a diagram showing the components of a line generator system according to an illustrative embodiment, arranged to generate an exemplary segmented-line feature.

The arrangement of components provided herein enables the generation of lines with a variety of projected features in addition to the advantageous reduction of speckle. FIG. 6 shows an example of a line generation system 600 in which a laser and deflector (or other motion-generating) component 610 generates a sweeping line fan 620 as described above. The fan 620 is transmitted through an optical component 630, which can define any combination of lens, and linear diffuser function. As described generally above the optical component 630 can include (e.g.) a cylinder array or diffractive element and/or a hologram that allows special line effects to be generated. For example, the diffractive element can be chirped diffraction grating with a Free Spectral Range (FSR) that causes diffracted line spacing in the planar fan 640 to change with a sweep angle of the coherent light 620 incident on the linear diffuser 630. As shown, the diffused rays 640 project a line 650 that is non-continuous, consisting of dashed segments 652, separated by unilluminated gaps 654 along the line axis. This is one of a variety of possible effects that can be generated. For example, the length of segments can vary along the axis (for example through use of a hologram).

Figure 7:
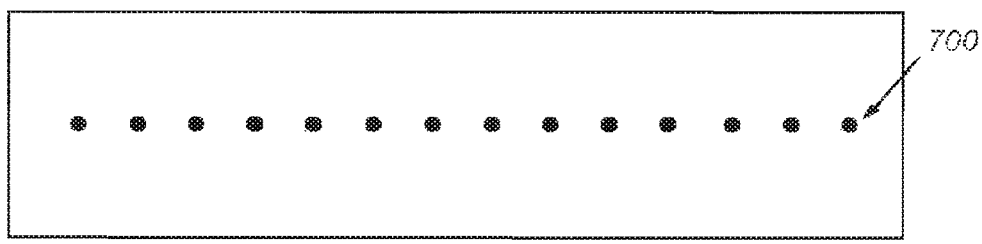
FIG. 7 is a diagram of an exemplary dotted-line feature, generated by a version of the arrangement of FIG. 6.
Figure 8:
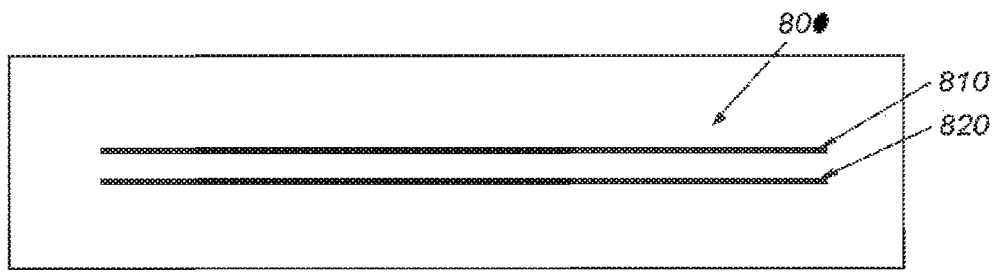
FIG. 8 is a diagram of an exemplary multiple-bar feature, generated by a version of the arrangement of FIG. 6.

In FIG. 7, the line generation system 600 can be used to generate a dotted pattern 700 of appropriate spacing between dots. Likewise, in FIG. 8, the line generation system 600 can be used to generate a line feature 800 that consists of multiple, parallel lines 810 and 820. A variety of optical components (that should be clear to those of skill (e.g. a customized hologram) can be used to divide the projected fan into multiple lines. Such lines can be divided into dots, dashes, etc. as described above.

V. Other Surface Effects

While the principles and embodiments described above relate to the phenomenon of speckle, the foregoing can be applied to reduce undesirable optical effects that relate to certain surface finishes from which the illumination line is reflected. Illustratively, surfaces that have small reflective facets—such as machined metal, sand-blasted metal, bead-blasted metal, peened, glittery or metallic painted finishes, etc. can be challenging to measure accurately with a typical laser line source. Since the typical laser line source is conventionally generated from a point source, it tends to generate random bright spots or sparkles that can saturate the image sensor (or other light-receiving component), and reduce the quality of the imaged/detected line. This effect can be termed "sparkle", and it produces optical disadvantages similar to those experienced with the above-described speckle. Thus, for the purposes of this description the term "speckle" should be taken broadly to also include sparkle. Note that sparkle can occur with the reflection of any type of light, whilst speckle is generally unique to reflected coherent light. Implementation of the above-described line generator (e.g. linear diffuser) serves to significantly reduce the sparkle effect. In this respect, the diffuser acts similarly to a conventional diffuser that achieves cloudy day illumination—however, in this instance the diffusive effect produced by the line generator occurs in a single dimension (parallel to the illumination line) whereby the line quality on the sparkle-generating surface is not reduced, and the imaged line quality is enhanced.

Illustratively, reduction of the sparkle effect in an illumination line or similar line-generated light source can be achieved using a variety of the arrangement(s) described above—for example a line generator, comprising a linear diffuser, hologram and/or diffractive array, in combination with a light source (coherent light or another collimated source), which is transmitted to a moving deflector (e.g. a MEMS or solid state device). Alternatively, the beam can be transmitted to a fan-generating optical component (e.g. a Powell lens) according to a prior art implementation and thereafter through the line generator.

VI. Scanning Implementation

Figure 9:
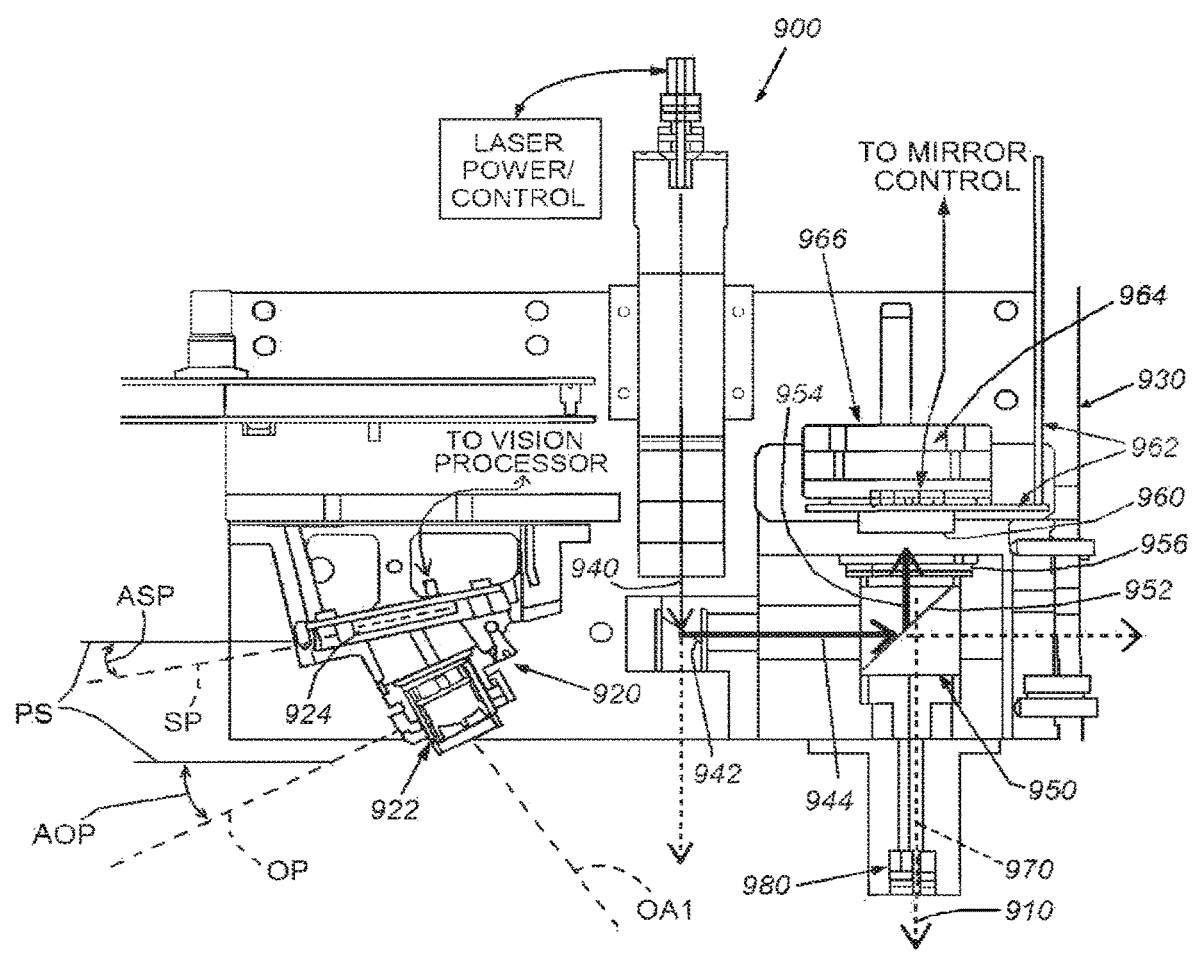
FIG. 9 is a side cross section of an exemplary DS system according to an alternate embodiment in which the lase line generator includes both a speckle-reduction arrangement and a scanning arrangement, employing a MEMS mirror that pivots along each of two substantially orthogonal axes.

FIG. 9 shows a DS system 900 according to an embodiment in which the generated planar fan 910 is projected upon a scene/object in a manner that also scans in a direction generally orthogonal to the planar fan—thus vitiating a need for a separate motion-generating mechanism (operating on the DS and/or object) to effect scanning over a predetermined working distance. The processor arrangement is similar to that described with reference to FIG. 1 (i.e. vision system processor 180). However, the mirror control 190 and (e.g. sensor process 182 and/or vision tools) are adapted, as described below, to allow for integrated scanning. In an embodiment, a commercially available, diode-based laser (e.g. approximately 40 mW) can be employed. The projected line can be red or another desired wavelength.

The DS system 900 includes a camera assembly 920 including an optics package (i.e. lens assembly) 922 defined along an optical axis OA1, and an image sensor 924. By way of non-limiting example, the optics package 922 can be modelled on the DS 1050 displacement sensor available from Cognex Corporation of Natick, MA The image sensor 924 in this exemplary embodiment is a 2D sensor that acquires images of a working section defined by two orthogonal axes (described below). Notably, the lens plane of the lens assembly 922 (dashed line OP) is oriented at an acute angle AOP with respect to the generalized plane (represented by lines PS) of the imaged scene in a range between approximately 20 and 30 degrees. The image plane (dashed line SP) of the sensor 924 is oriented at an acute angle ASP (with respect to the plane of the scene PS) that is generally shallower than the optics angle AOP, for example in a range of 10 to 15 degrees. The angles AOP and ASP are selected to cause lines imaged by the camera assembly 920 within the working section to adhere generally to the Scheimpflug principle, in which the lines appear to the image sensor 924 as relatively constant in thickness between near range and far range of the working section (see below).

The DS system 900 is enclosed in an appropriate housing 930 that maintains the components in an appropriate spatial relationship and can allow the system to be mounted with respect to the scene using brackets, etc. The housing 930 includes a solid state laser assembly (or other mechanism for projecting a similar coherent light). The laser in this embodiment delivers a pencil-like beam 940 of appropriate thickness in the depicted downward direction into a polarizing beam splitter 942, which reflects the resulting beam 944 at a 90-degree angle in a polarized condition as shown. In alternate arrangements, with a laser having a different size or housing form factor, the laser can be directed straight into a polarizer, the beam splitter assembly 950, or other structured-light/conditioning component. The polarized beam 944 is directed into a beam splitter assembly 950 with beam-splitting mirror 952 that again reflects the resulting beam 954 upwardly through a (e.g. ¼ λ) wave plate 956. The upwardly reflected beam 954 is projected onto a MEMS mirror 960 that is driven by a (PCB) circuit board 962 mounted on an adjustment plate assembly 964. The PCB is controlled as part of the processor mirror control described above. The adjustment plate assembly allows the manufacturer to apply fine tilt adjustments to the mirror to ensure it is properly aligned using (e.g.) set screws. The overall mirror mounting arrangement 966 is fixed within the housing 930 so that it is generally free of vibration and play allowing the relative angle between the optical axis OA1 and the illumination line to remain stable.

Notably, the MEMS mirror in this embodiment can comprise a multi-axis (two-degree of freedom) design that, by way of non-limiting example, is available from Opus Microsystems of Taiwan. Certain models (e.g. the OP-6111) have a fixed scan frequency of 22,000 Hz in a fast direction (+/−20 degrees) and 1,400 Hz in a slow direction (+/−15 degrees). Other soon-to-be available mirrors (e.g. the OP-6200) support fast scan frequencies of 18,500 Hz (+/−22 degrees) and a controllable slow scan frequency (+/−12 degrees) using a voltage waveform signal. The stated operative angle ranges for each pivot axis are exemplary, and in practice, the DS working section will reside in a subset of the overall angle range.

The resulting beam (dashed line 970) is reflected by the MEMS mirror 960 through the wave plate 956, and through the polarizing beam splitter mirror 952. The beam then passes into a (e.g.) cylinder lens/linear diffuser assembly 980. As described above and further below, the linear diffuser employs the principles described herein to spread the beam 970 into the desired planar fan 910. Notably, the combination of the polarizing beam splitter 942 and λ/4 wave plate 956 effectively eliminates all back reflections within the optical path. The optical path also includes (at an appropriate position) a thin mask that attenuates light that misses the MEMS mirror and is reflected from the reflective surfaces around the MEMS mirror and the λ/4 wave plate 956 front surface and the polarizing beam splitter 952 back surface. These features significantly reduce alignment requirements for the system during manufacture.

Figure 10:
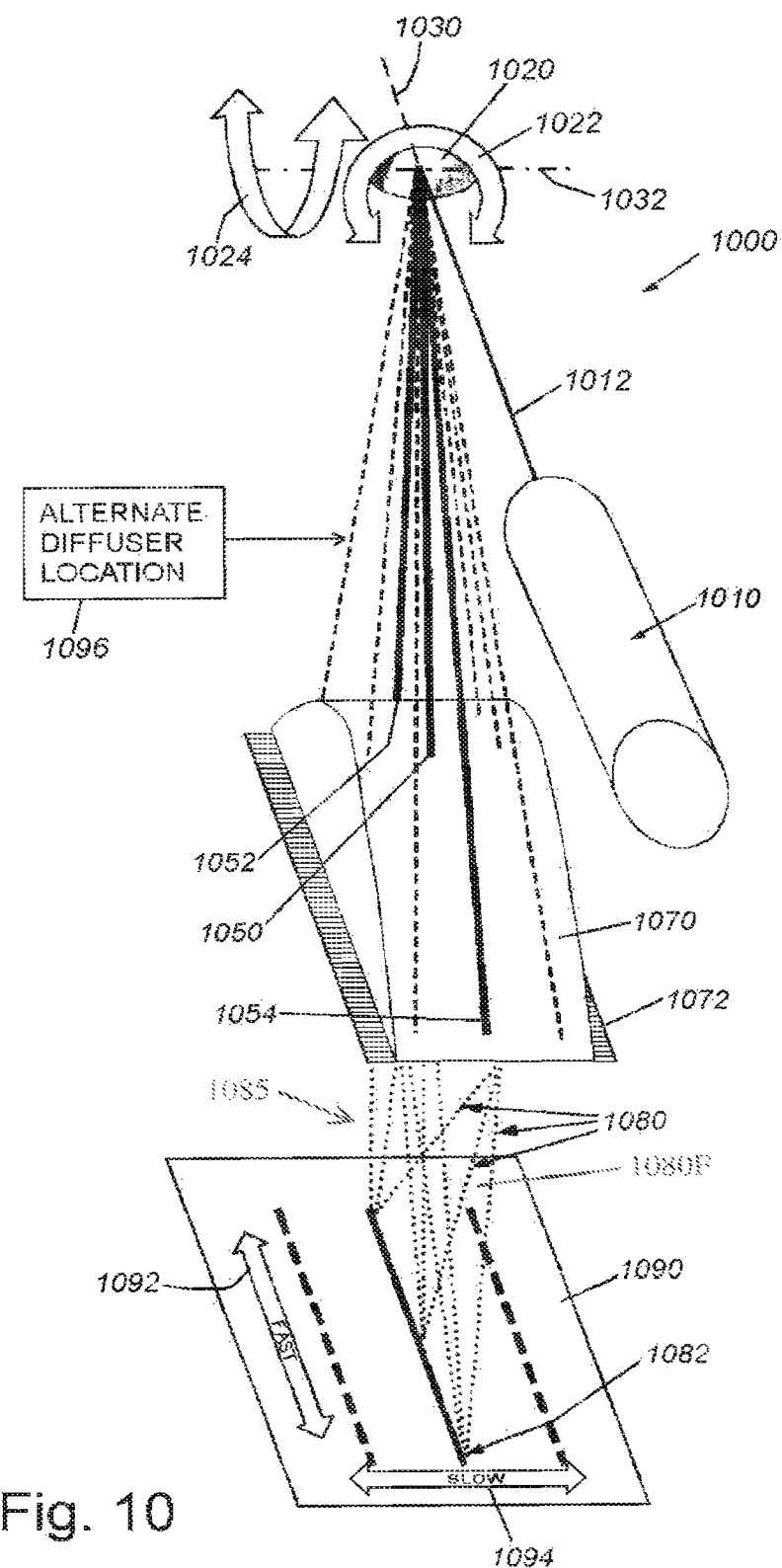
FIG. 10 is a side-oriented perspective view of a laser line generator with a de-speckling and single line scanning arrangement according to the exemplary embodiment of FIG. 9.
Figure 11:
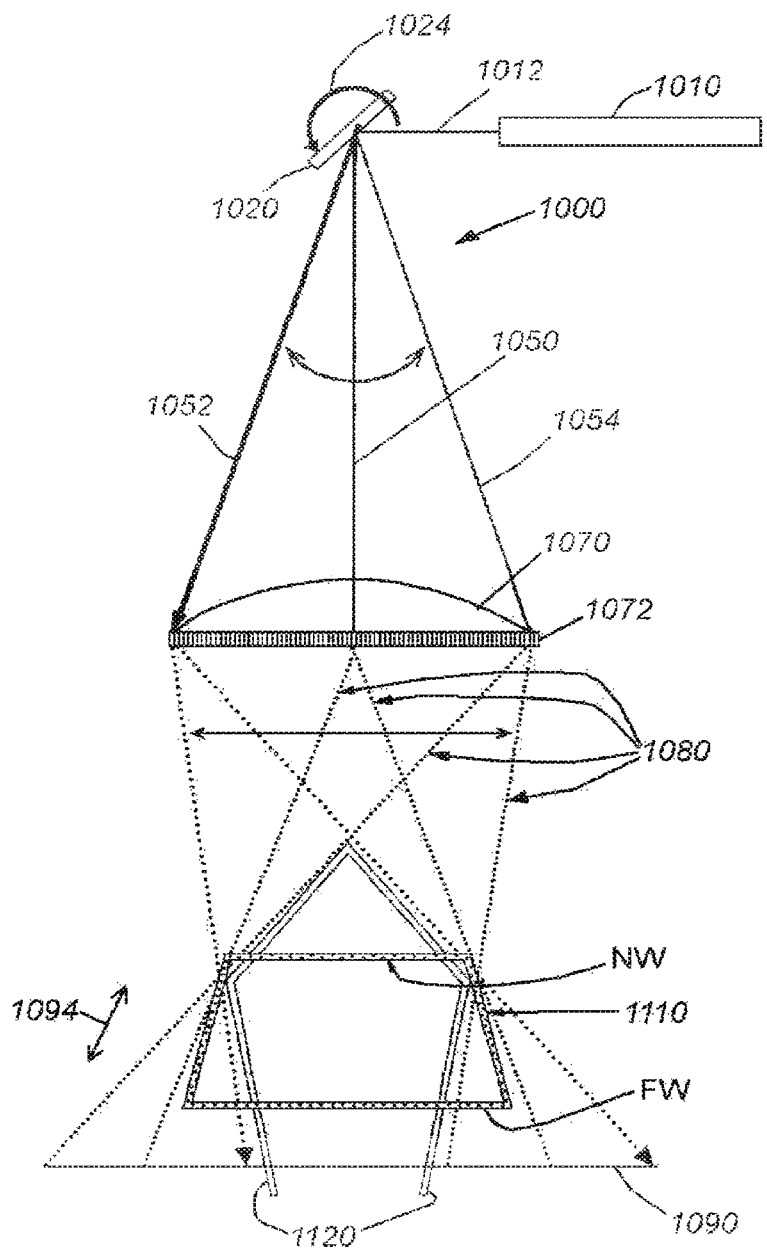
FIG. 11 is a front-oriented, view of the laser line generator of FIG. 10, showing an exemplary working section.

Reference is also made to FIG. 10, which shows an example of a DS system 1000 detailing the operational theory of the scanning laser arrangement according to the DS system 900 of FIG. 9. As shown, the laser source 1010 projects a beam 1012 along an axis to a pivoting (MEMS) mirror assembly 1020. The mirror assembly 1020 oscillates (double-curved arrows 1022 and 1024) about two orthogonal axes 1030 and 1032 (typically oriented at right angles with respect to each other). Typically rotation of the mirror assembly 1020 about the axis 1032 generates a fan pattern, also referred to as a sweeping fan. The sweeping fan is denoted by the three lines 1050, 1052 and 1054, and the characteristic of this sweeping fan is described above in connection with the sweeping fans 154, 230. The laser, in the form of a sweeping fan is directed through an (optional) cylindrical lens 1070 and linear diffuser 1072. The combination of lens 1070 and diffuser 1072 generate, for each of the three lines 1050, 1052 and 1054, a corresponding fan-shaped diffused-light pattern 1080F (formed from lines 1080). In this manner, the sweeping beam 1050-1054 effectively projects a planar fan 1085 (formed from a sequence of instances of the fan-shaped diffused-light pattern 1080F) onto the surface 1090, such that the intersection of the planar fan with the surface defines a de-speckled illumination line 1082. The de-speckled illumination line 1082 is generated by the oscillation of the mirror 1020 in a fast scan direction (double arrow 1092). As described above, the fast scan can oscillate in excess of 20,000 Hz in certain embodiments. Notably, the mirror assembly 1020 also oscillates in a slow scan direction (double arrow 1094), typically at 1,000-2,500 Hz, or less, about the axis 1030 so that the overall planar fan 1085 and de-speckled illumination line 1082 sweeps along the slow scan direction (1094). With further reference to FIG. 11, the DS system 1000 is further depicted in FIG. 11. This depiction shows the working section 1110, in which a substantially uniform line (delineated by boundaries 1120) is projected on the surface 1090. The near working section NW and far working section FW are also depicted, and the projected illumination (laser) line appears substantially uniform throughout the (slow) scan range (double arrow 1094), due to the angles chosen for components of the optics package 920.

While the linear diffuser 1072 is shown beneath the cylindrical lens 1070 within the optical path, it is contemplated that the linear diffuser can be located at other positions within the path. For example, it can be located between the mirror assembly 1020 and lens 1070 (location 1096 in FIG. 10) or at other appropriate positions that should be clear to those of skill. Likewise, while a polarizer and/or beam splitter(s) is/are employed, these components can be omitted or altered to suit the performance requirements and/or internal layout of the DS in a manner clear to those of skill.

Figure 12:
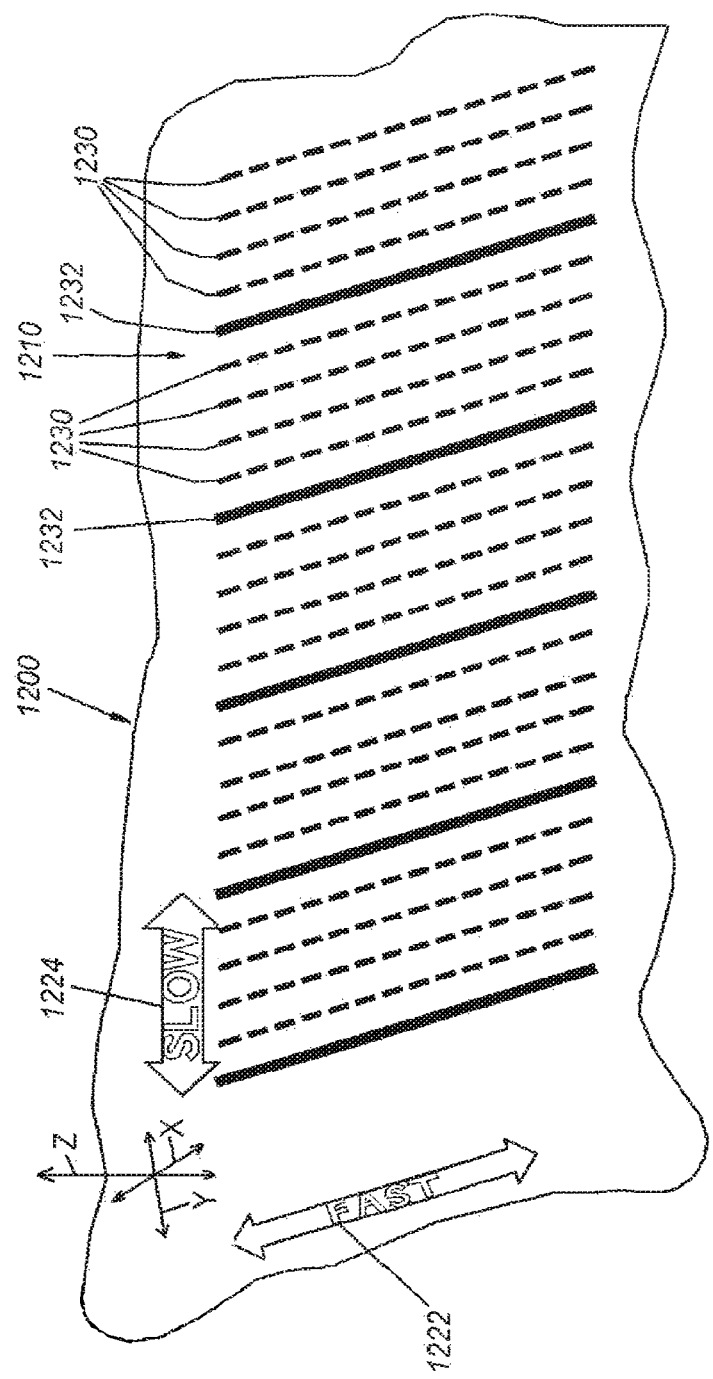
FIG. 12 is a diagram showing multiple simultaneously projected lines (solid) on the surface, and their subsequent positions as they are scanned.

FIG. 12 shows an exemplary scan pattern 1200 projected on a surface 1210 (shown as planar/flat for illustration purposes). The MEMS mirror assembly generates line in the fast scan direction (double arrow 1222) that is swept along the surface 1210 in the slow scan direction (double arrow 1224) so as to cover the working section. A series of scan lines 1232 are depicted, showing a line in each acquired image frame from which a profile is determined. In embodiments in which the mirror sweeps at a relatively fast rate in the slow direction, such as a MEMS mirror sweeping in a resonant mode in that direction, it is contemplated that the laser can be pulsed or shuttered in certain embodiments to avoid blurring of the line as it is acquired by the image sensor. For example, a MEMS mirror scanning at 20 kHz in the fast scan 1222 direction and at 2 KHz in the slow scan direction 1224 would require the linear diffuser 1072 to be rotated 5.7° (atan(2/20)) to approximately compensate for the tilt of the central portion of the line 1232 as it is directed in two directions. In this example, the laser 1010 would be turned on for only the central 80% of the sweep in one direction only where the sweep is substantially moving perpendicular to the diffusing features of the diffuser 1072. Further, in this example the laser 1010 would be cycled at a rate of 10 kHz with a duty cycle of less than 40% and in phase with the sweep of the mirror 1020. The spatial sampling is no different than in any other line scanning system. In the x, or illumination line, direction, the sampling resolution Sx is solved by dividing (i) the number of pixels Np projected on the part 1210 under test (PUT) by (ii) the length of the projected line of pixels Lp. Sx=Lp/Np. In our example, if the length of the line of projected pixels is 100 mm and the line is composed of 1000 pixels then the spatial sampling in the x, or illumination, line direction is 1/100 microns. In the y direction or the direction perpendicular to the line, the spatial sampling Sy is equal to the distance between samples Ds. Sy=Ds. In our example, if the line is advanced 1 mm after each exposure, the spatial sampling will be 1/1 mm. Spatial resolution, Rx and Ry, are also calculated as in a standard imaging system with the differentiator that in addition to the convolution of the imaging system blur spot, the linewidth in the y direction of the swept (averaged by sweeping) line must be convolved as in any laser line triangulation system. However, more generally it is contemplated that the slow scan rate can be controlled to allow a sweep that is accurately acquired by the image sensor at its operation frame rate. For example, with a MEMS mirror with linear control of the slow axis 1224, the scan line can be stepped to a position to be measured and then held in that position for an integration/exposure time. To achieve maximum speckle reduction, the minimum integration time should be greater than or equal to ½ of the full cycle period of the fast axis 1222 of the MEMS mirror. In the case of the 20 kHz mirror, this should be 25 microseconds. Systems with a field lens 1070 can use shorter times since the illumination line 1232 is stationary on the part 1210 (in the line direction). The shorter integration time will result in an increase in speckle contrast by a factor of the square root of two for each halving of the minimum time. After integration is complete, the sensor is shuttered and read out, and the MEMS mirror can advance the line during the readout period. Spatial sampling is as above. The acquisition rate should be sufficiently high to capture the line with minimal blur as it sweeps across the surface. The location (along the y-axis direction) of the line can be derived from the motion of the mirror, based upon the mirror control, and used to determine relative location (along the y-axis direction) of the line within the working section. For example, if the mirror is commanded to an angle 5 degrees from its nominal position, the law of reflection predicts that the beam will be deflected twice that angle or 2×5°=10°. The mirror deflection angle may be determined wither open loop from a previously calibrated lookup table of either voltages in the case of electrostatic MEMS and galvanometers, or currents in the case of electromagnetic MEMS. Knowledge of this angle can be used to adjust the height of the profile calculated by standard triangulation techniques. Spatial sampling and resolution is calculated as described above. Alternatively, the relative location (along the y-axis direction) of the line versus the near and far boundaries of the working section can be used to determine relative position of the line. For example, if a part smaller than the field of view is scanned, and the background of the measurement area is a flat plate, the parts of the line that extend beyond the part can be used to accurately determine a line through which each illumination plane must pass. The planes' complete positions are fully determined since all of these planes must pass through the intersection of the laser beam and the MEMS mirror. Spatial sampling and resolution is calculated as described above. Internal calibration of the DS is employed to accurately compute the profile of any acquired line in the height (z-axis) direction.

In further embodiments, the line can be spread into multiple lines along the y-axis direction using an optional, second linear diffractive element. This allows multiple lines to sweep the image, thereby generating multiple profiles. Dashed scan lines 1230 are depicted between solid lines 1232, representing a grouping of lines within a single acquired image frame. This allows multiple profiles to be acquired in each image frame, speeding the overall scan process. For example, a simple scan would scan one line along a part. Each camera frame would collect one profile per image. n evenly spaced lines on a part would only have to travel 1/n in distance on the part or angle at the mirror. Each camera frame would be reading n lines and getting n times as much data. The number of frames required would now be 1/n of the frames required for a single scan. A 100 mm part that was scanned with a spatial resolution of 100 microns in y would need 1000 images and 5 seconds assuming a frame rate of 200 Hz. If we were projecting 10 lines, we would only need 100 images and ½ a second.

Figure 13:
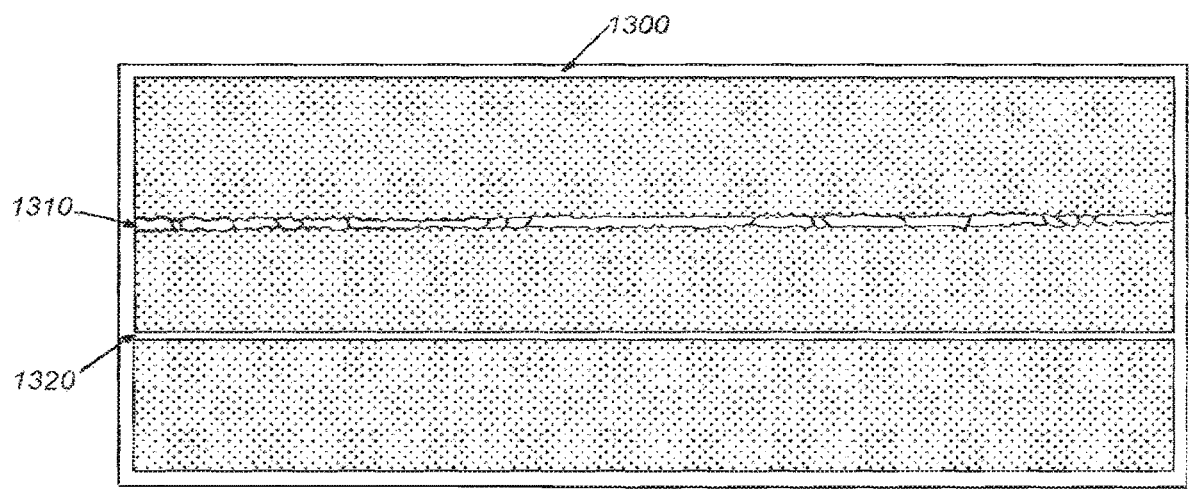
FIG. 13 is a diagram with an image of an exemplary laser line generated by the exemplary DS system of FIG. 9 compared to a side-by-side speckled line generated using conventional optics/components.

With reference to FIG. 13, the depicted image 1300 shows two acquired lines 1310 and 1320. The upper line 1310 is a typical specked line generated using (e.g.) a Powell lens. Note the generally non-uniform edge and granular texture that reduces profile accuracy. The lower line 1320 is generated using the above-described DS arrangement. It is substantially more uniform and defined, allowing for better profile accuracy, a brighter illumination, and hence, a quicker scan of objects. By way of example, the upper line 1310 exhibits 0.240 pixels rms width variance 1σ, while the lower line 1320 exhibits 0.074 pixels rms width variance 1σ. This is the first measured data from the first prototype built in accordance with the disclosed technologies. We have measured speckle contrast at the noise floor (5%) of our early test bed and have rough measurements of speckle contrast of less than 10% at 1 meter diffuser to part distance with a diffuser scan length of only 25 mm and no field lens.

Figure 14:
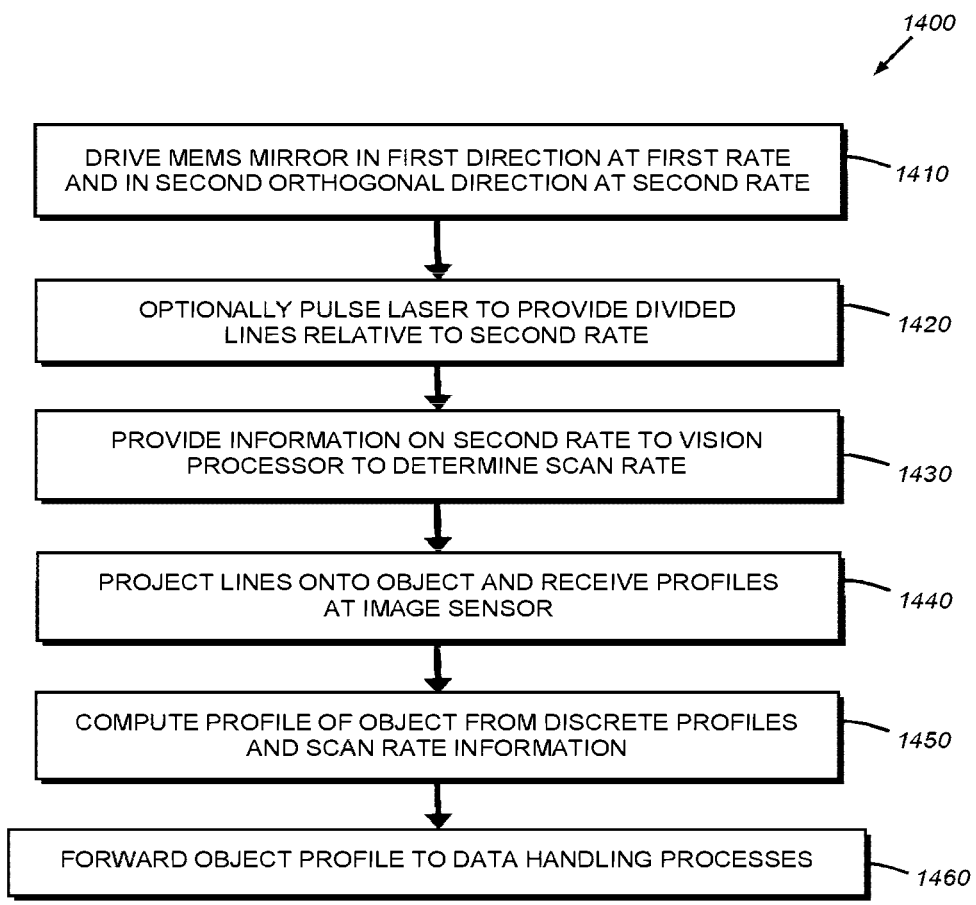
FIG. 14 is a flow diagram showing a generalized procedure for operating a DS system according to FIG. 9.

Reference is now made to FIG. 14, which shows a generalized flow diagram 1400 describing the operation of the DS (e.g., 900), according to the exemplary embodiment. In step 1410, the mirror control uses appropriate inputs—e.g. constant and/or modulated voltage—to drive the MEMS mirror at a first (fast) rate in a first direction and at a second (slow) rate in a second direction that is substantially orthogonal to the first direction. In step 1420, the projected beam can be (optionally) pulsed or shuttered to allow for reduced blur where the slow scan rate is higher than the sensor acquisition rate can handle. In step 1430, the mirror control can provide information on the slow rate to the vision process(or) so that the location of the line along the y-axis can be determined. This information can also be derived via the acquired image by determining the relative location of the acquired line in the image frame versus the bounds of the working section, and/or through the timing of each acquisition, with knowledge of how far the mirror (and line) moves in each image frame. In step 1440, the line projected on the object in the scene generates profiles that are imaged by the image sensor. In step 1450, the profile is used to compute an object height at that slice based upon the internal calibration data as well as slow scan rate, or other data that provides a y-axis location for the profile slice. In step 1460, the overall profile of the object is stored and/or transmitted to a downstream process that employs the information for further analysis and/or tasks—for example part inspection.

It should be clear that a DS (e.g., 900) can be sized appropriately to the desired vision system task. It should be clear to those of skill that associated components can be scaled upwardly or downwardly to provide the requisite functionality to perform the task.

VII. Further Arrangements and Applications

Figure 15:
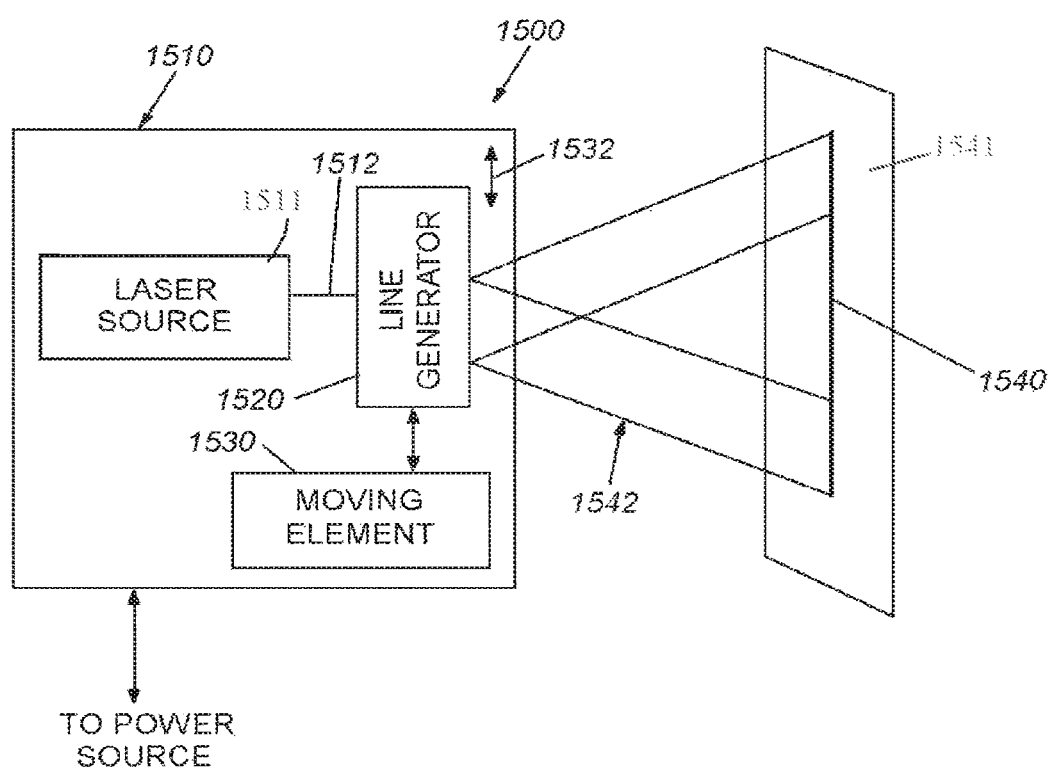
FIG. 15 is a diagram of a generalized line generation system in which a moving element drives a line generator, such as a linear diffuser in an oscillatory manner according to an embodiment.

A variety of other uses and/or implementations of a reduced-speckle illumination line can be provided in accordance with the teachings herein. In FIG. 15, an example of a DS system 1500 includes a reduced-speckle illumination line generation system 1510 in which a laser source 1511, as described above, projects a collimated beam 1512 into a line generator 1520, which comprises a linear diffuser of a form described above. Various optics, filters, polarizers, beam splitters, etc. as also described, above can be provided. The line generator 1520 is operatively connected to a moving element (oscillatory driver) 1530 that causes an oscillatory (e.g. cyclic) movement (double arrow 1532) within at least one plane. The moving element can be a MEMS based component, voice coil, or any other acceptable drive system, for example operating on electromagnetic principles. The motion (1532) of the line generator 1520 produces an illumination line 1540 at the intersection of a traced fan 1542 with a working surface 1541. The line generator 1520 creates the traced fan 1542 through a combination of diffusion and displacement of the beam 1512. The system 1510 is powered by an appropriate power source and controllers as described above.

Figure 16:
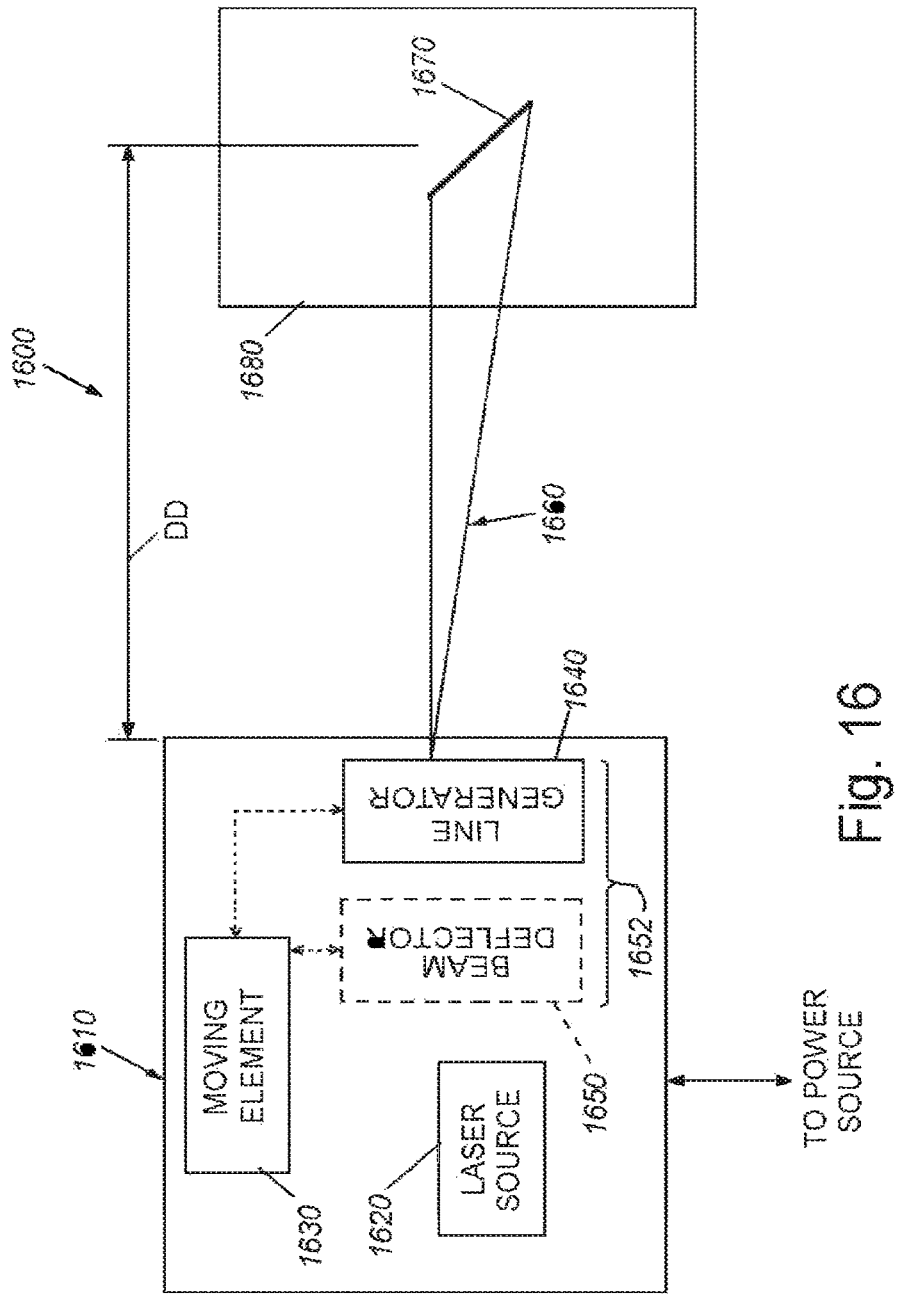
FIG. 16 is a diagram of a line generation system according to any of the above-described arrangements or embodiments shown providing a projected line at a distance for a variety of applications.

In FIG. 16, an example of a DS system 1600 includes a line generation system 1610 having a laser source 1620, moving element 1630, line generator 1640 and beam deflector (shown in dashed form as optional) 1650. The moving element 1630 can drive the line generator 1640 as described in the DS system 1500 (FIG. 15) above, or a stationary line generator element (linear diffuser, etc.) can be provided and the beam deflector (e.g. a mirror moved by the moving element) 1650 can generate a traced fan 1660 from the collimated beam. The term "line generator" in this example can define either the diffusive (or other) optical element in direct combination with the moving element (i.e. FIG. 15 embodiment), or the diffusive element in a stationary mounting with the moving element in combination with the beam deflector (e.g. a MEMS mirror embodiment). Hence, the beam deflector 1650 is depicted as combined (bracket 1652) into the line generator 1640 as these two components can collectively be termed "line generator" in certain embodiments. Notably, the line generating system (1610), according to the various arrangements herein, can be used in applications other than machine vision, where the projection of a de-speckled and/or more uniform line is desired. As shown, the illumination line 1670 is the intersection of the traced fan 1660 with a distant surface 1680, which is spaced apart from the line generator 1640 by a working distance DD that can be centimeters, meters, or tens of meters (among other distances), in various embodiments. For example, the line generating system can generate a more uniform and crisper line in building applications, surveying, targeting, etc.

Figure 17:
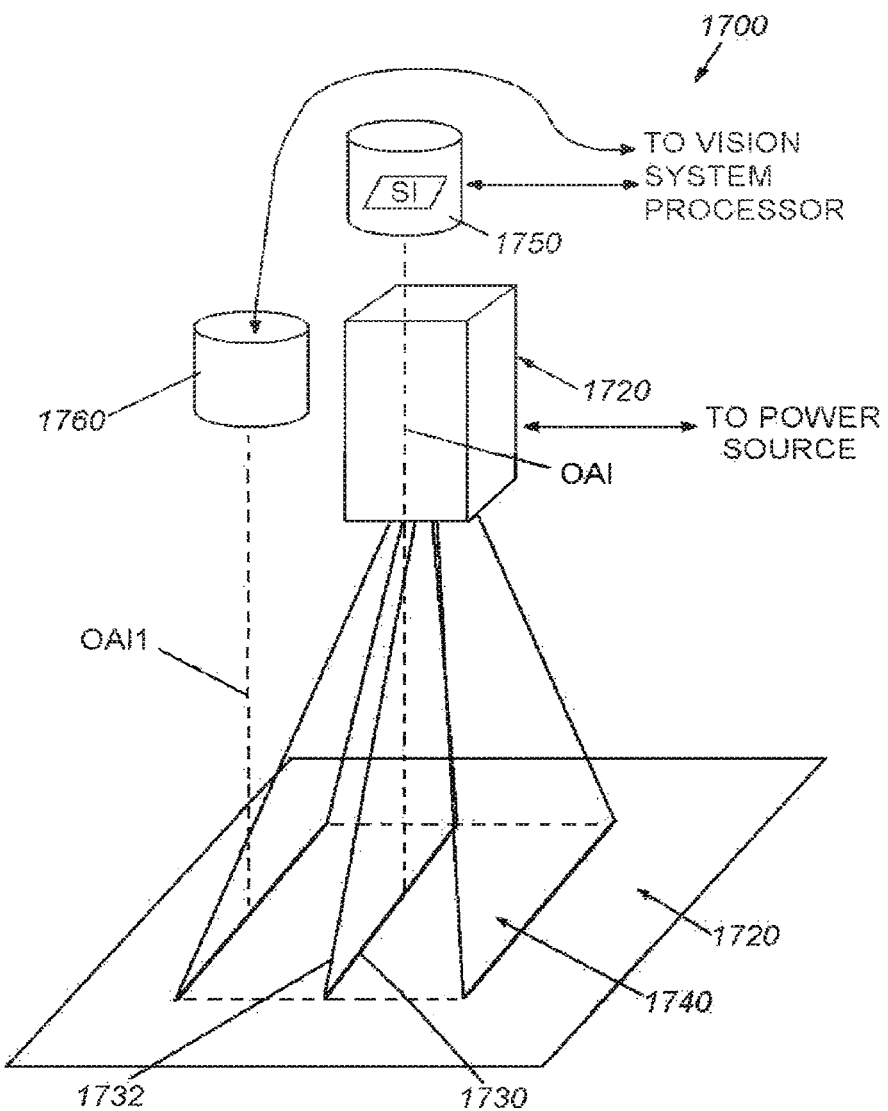
FIG. 17 is a diagram of a line generation system used to provide illumination in a 2D imaging application, either as a discrete line or as a scanned line that fills a working section of the camera.

More generally, the line generation system according to the various embodiments herein can be employed as an illumination system for use in machine vision (vision systems) and/or other applications. FIG. 17 shows an example of a DS system 1700, in which the line generation system 1710 according to any embodiment or arrangement herein can be used to illuminate a scene/object 1720 in a 2D imaging implementation. The illumination provided is advantageously crisper and more-well-defined. It is also more uniform and has the added advantage of, in essence, allowing the illumination line 1730 (formed as the intersection of a planar fan 1732 and the scene/object 1720) to bend around obstructions and generally resist deformation based upon surface imperfections (scratch-digs), etc. By arranging the line generation system 1720 with a beam deflector (e.g. MEMS mirror) that oscillates along multiple axes (i.e. multiple degrees of freedom), the illumination can be provided as an area 1740, within the working section of the image sensor SI. The sensor SI can be part of a camera system 1750 that can be arranged via beam splitters, etc. to have an image axis OAI that id coaxial/coplanar with the planar fan 1732. The oscillation of the line can be controlled at sufficiently fast a rate that is viewed (in an additive manner) as a single illuminated region by the image sensor SI. Alternatively, the camera 1760 can define an axis OAI1 aligned parallel to the plane of the planar fan 1732. In general, certain DS units can also take advantage of 2D grayscale measurements that are facilitated by the illumination line 1730 as it also provides height displacement data. The reduced speckle and increase uniformity of the illumination line 1730 provides a more accurate grayscale rendition of the scene/object.

In some implementations, an illumination apparatus for reducing speckle effect in light reflected off an illumination target may be configured in accordance with the following aspects.

In general aspect 1, an illumination apparatus comprising:
  a light source configured to emit coherent light;
  a linear diffuser positioned in an optical path between an illumination target and the light source, the linear diffuser being configured to diffuse the coherent light into diffused light that spreads in one dimension across at least a portion of the illumination target, which has an associated exposure time for illumination of the illumination target by the diffused light, wherein the diffused light forms a planar fan of light that is generally free of broadening in a direction perpendicular to the one dimension;
  a beam deflector positioned between the light source and the linear diffuser on the optical path; and
  a controller coupled with the beam deflector;
  wherein the controller is configured to operate the beam deflector to direct the coherent light incident on the beam deflector to sweep across different locations on the linear diffuser within the exposure time for illumination of the illumination target by the diffused light; and
  wherein the different locations span a distance across the linear diffuser that provides sufficient uncorrelated speckle patterns at an image sensor in light reflected from an intersection of the planar fan of light with the illumination target to add incoherently when imaged by the image sensor within the exposure time for illumination of the illumination target by the diffused light.

Aspect 2 according to aspect 1, wherein the light source comprises a laser.

Aspect 3 according to aspect 1 or 2, wherein the beam deflector comprises a microelectromechanical system (MEMS) mirror.

Aspect 4 according to aspect 1 or 2, wherein the beam deflector comprises an acousto-optic modulator (AOM) device.

Aspect 5 according to any one of aspects 1-4, comprising a cylinder lens positioned in the optical path between the linear diffuser and the beam deflector to operate as a field lens to increase efficiency by concentrating all of the coherent light is directed to the linear diffuser.

Aspect 6 according to any one of aspects 1-4, comprising a cylinder lens, wherein the linear diffuser is positioned between the beam deflector and the cylinder lens, and wherein the cylinder lens is configured to operate as a field lens to increase efficiency by concentrating all of the diffused light directed to the illumination target.

Aspect 7 according to any one of aspects 1-6, wherein the linear diffuser comprises an engineered diffuser with a flat top intensity profile along the one dimension.

Aspect 8 according to any one of aspects 1-6, wherein the linear diffuser comprises a chirped diffraction grating with a Free Spectral Range (FSR) that causes diffracted line spacing in the planar fan of light to change with a sweep angle of the coherent light incident on the linear diffuser.

Aspect 9 according to any one of aspects 1-6, wherein the linear diffuser comprises a hologram or a cylinder array.

Aspect 10 according to any one of the previous aspects, wherein
  the linear diffuser is stationary with respect to a base portion of the beam deflector, and
  the controller is configured to operate the beam deflector to direct the coherent light in a cycling left-right-left sweep with respect to the linear diffuser, such that the coherent light is directed through either the left-right half or the right-left half of the left-right-left sweep within the exposure time for the illumination of the illumination target by the diffused light.

In some implementations, a laser displacement measuring system may be configured in accordance with the following aspects.

In general aspect 11, a laser displacement measuring system comprising:
  a vision system processor;
  a camera assembly coupled with the vision system processor;
  a laser beam assembly coupled with the vision system processor, the laser beam assembly configured to emit coherent light;
  a beam deflector positioned to receive the coherent light;
  a controller coupled with the beam deflector; and
  a linear diffuser positioned in an optical path between an illumination target and the beam deflector;
  wherein the controller is configured to operate the beam deflector to direct the coherent light incident on the beam deflector to sweep across different locations on the linear diffuser;
  wherein the linear diffuser is configured to diffuse the coherent light, received from the beam deflector at the different locations, into diffused light that spreads in one dimension across at least a portion of the illumination target, which has an associated exposure time for illumination of the illumination target by the diffused light, wherein the diffused light forms a planar fan of light that is generally free of broadening in a direction perpendicular to the one dimension; and
  wherein the different locations span a distance across the linear diffuser that provides sufficient uncorrelated speckle patterns at an image sensor in light reflected from an intersection of the planar fan of light with the illumination target to add incoherently when imaged by the image sensor within the exposure time for illumination of the illumination target by the diffused light.

Aspect 12 according to aspect 11, wherein
the linear diffuser is stationary with respect to a base portion of the beam deflector, and
the controller is configured to operate the beam deflector to direct the coherent light in a cycling left-right-left sweep with respect to the linear diffuser, and the controller is configured to operate the beam deflector to direct the coherent light through either the left-right half or the right-left half of the left-right-left sweep within the exposure time for the illumination of the illumination target by the diffused light.

Aspect 13 according to aspect 11 or 12, wherein the linear diffuser comprises an engineered diffuser with a flat top intensity profile along the one dimension.

Aspect 14 according to aspect 11 or 12, wherein the linear diffuser comprises a cylinder array.

Aspect 15 according to aspect 11 or 12, wherein the linear diffuser comprises a hologram.

Aspect 16 according to aspect 15, wherein the hologram is configured to project the planar fan of light onto the illumination target in a non-continuous pattern.

Aspect 17 according to aspect 16, wherein the non-continuous pattern comprises at least one of dots, and line segments separated by non-illuminated gaps.

Aspect 18 according to aspect 11 or 12, wherein the linear diffuser comprises a chirped diffraction grating with a Free Spectral Range (FSR) that causes diffracted line spacing in the planar fan of light to change with a sweep angle of the coherent light incident on the linear diffuser.

Aspect 19 according to any one of aspects 11-18, wherein the beam deflector comprises a microelectromechanical system (MEMS) mirror.

Aspect 20 according to any one of aspects 11-18, wherein the beam deflector comprises an acousto-optic modulator (AOM) device.

Aspect 21 according to any one of aspects 11-20, comprising a cylinder lens positioned in the optical path between the linear diffuser and the beam deflector, and configured to operate as a field lens to increase efficiency by concentrating all of the coherent light is directed to the linear diffuser.

Aspect 22 according to any one of aspects 11-20, comprising a cylinder lens, wherein
the linear diffuser is positioned between the beam deflector and the cylinder lens, and
the cylinder lens is configured to operate as a field lens to increase efficiency by concentrating all of the diffused light directed to the illumination target.

Aspect 23 according to any one of aspects 11-22, wherein the laser beam assembly comprises a laser.

Aspect 24 according to any one of aspects 11-23, wherein the camera assembly is configured to
capture light reflected from the intersection of the planar fan of light with the illumination target, and
generate image data from the captured light.

Aspect 25 according to aspect 24, wherein the vision system processor is configured to
receive the image data from the camera assembly, and
process the image data to perform at least one of measurement and inspection on a region of the illumination target.

Aspect 26 according to any one of aspects 11-25, wherein the camera assembly comprises an image sensor with a first optical plane and a lens assembly with a second optical plane that is non-parallel to the first optical plane, each oriented to adhere to the Scheimpflug principle with respect to the planar fan of light.

In some implementations, a system for generating a line on a working surface with reduced speckle may be configured in accordance with the following aspects.

In general aspect 27, a system comprising:
a laser source in the form of a collimated beam;
a line generator that receives at least part of the collimated beam and projects the light passing there through onto the working surface as a line; and
a moving element that causes the collimated beam to move in an oscillatory motion substantially within at least one plane.

Aspect 28 according to aspect 27, wherein the laser source comprises a stationary laser beam source and further comprising a moving beam deflector operatively connected to the moving element.

Aspect 29 according to aspect 28, wherein the moving element and beam deflector comprise one of a MEMS mirror, a galvanometer operated mirror, a voice coil operated mirror, Piezo electric operated mirror, and a solid state mirror unit.

Aspect 30 according to aspect 29, wherein the MEMS mirror is arranged to oscillate in two substantially orthogonal degrees of freedom and so that the line is generated along a first direction and the line moves along the working surface in a second direction.

Aspect 31 according to aspect 28, further comprising, within a path of the beam, a beam splitter and a polarizer assembly that reduces back reflection through the beam splitter and redirects the beam into the beam deflector.

Aspect 32 according to any one of aspects 27-31, wherein the line generator is a linear diffuser.

Aspect 33 according to any one of aspects 27-32, further comprising a field lens that is one of (a) located between the oscillating laser source and the line generator and (b) unitary with the line generator and located between the oscillating laser source and the line generator.

Aspect 34 according to any one of aspects 27-33, wherein light from at least a portion of the line projected on the working surface is captured by a sensor and the sensor generates image data from the captured light.

Aspect 35 according to aspect 34, wherein the image data is used by a processor to perform at least one of measurement and inspection on a region of the working surface.

Aspect 36 according to any one of aspects 27-35, wherein the working surface defines at least a portion of an object to be measured or inspected.

Aspect 37 according to any one of aspects 27-36, wherein the line generator is adapted to construct at least one of a laser displacement sensor and an illumination source.

Aspect 38 according to aspect 37, wherein the laser displacement sensor is operatively connected to a vision system processor.

Aspect 39 according to any one of aspects 27-31 and 33-38, wherein the line generator comprises an optical component having at least one of a linear diffuser, a hologram and a cylinder array.

Aspect 40 according to aspect 39, wherein the line generator is adapted to, at least one of (a) project the line in a non-continuous pattern and (b) project the line in a pattern defined by at least one of dots, and line segments separated by non-illuminated gaps.

In some implementations, a method for generating a line with reduced speckle may be implemented in accordance with the following aspects.

In general aspect 41, a method comprising:
  projecting a laser source in the form of a collimated beam; and
  transmitting the collimated beam through a line generator and onto the working surface as a line; and
  oscillating the collimated beam in an oscillatory motion substantially within a plane.

Aspect 42 according to aspect 41, wherein the oscillating comprises projecting a stationary laser beam source into a moving beam deflector.

Aspect 43 according to aspect 41 or 42, wherein the transmitting comprises passing the collimated beam through a field lens located in line with the line generator.

Aspect 44 according to any one of aspects 41-43, further comprising, capturing light from at least a portion of the line projected on the working surface with a sensor and generating, with the sensor, image data from the captured light.

Aspect 45 according to aspect 44, further comprising, processing the image data to perform at least one of measurement and inspection on a region of the working surface.

Aspect 46 according to any one of aspects 41-45, wherein the working surface defines at least a portion of an object to be measured or inspection.

Aspect 47 according to any one of aspects 41-43, wherein the step of oscillating includes oscillating the beam deflector at a first rate about a first axis and at a second rate about a second axis, substantially orthogonal to the first axis.

In some implementations, a system for reducing at least one of speckle effect and sparkle effect in a line projected on a surface may be configured in accordance with the following aspects.

In general aspect 48, a system comprising:
  a collimated light source;
  an optical component that generates a fan of light within one or more predetermined angles on each side of a central optical axis; and
  a line generator through which the fan passes located between the optical component and the surface.

Aspect 49 according to aspect 48, wherein the optical component comprises at least one of a MEMS mirror, a solid state deflector and a Powell lens.

In some implementations, a system for scanning a surface to determine a 3D profile may be configured in accordance with the following aspects.

In general aspect 50, a system comprising:
  a vision system camera that images the surface along an optical axis;
  a collimated light source;
  a MEMS mirror receiving the collimated light source and projecting it onto the surface at a non-parallel angle with respect to the optical axis;
  a mirror controller that oscillates the MEMS mirror in at least two orthogonal degrees of freedom so as to (a) generate a fan of light along a first direction within a one or more predetermined angles on each side of a central optical axis and (b) move the fan along a second direction to cause the fan to scan a surface; and
  a line generator, through which the fan passes, located between the MEMS mirror and the surface.

Aspect 51 according to aspect 50, further comprising at least one of (a) a polarizing beam splitter and polarizer located along the optical path of the collimated light source and (b) a cylindrical lens within the optical path.

Aspect 52 according to aspect 50 or 51, wherein the line generator comprises a linear diffuser.

Aspect 53 according to any one of aspects 50-52, wherein the mirror controller oscillates the MEMS mirror at a first rate in the first direction and a second rate, slower that the first rate, in the second direction.

Aspect 54 according to any one of aspects 50-52, wherein the vision system camera includes an image sensor with a first optical plane and a lens assembly with a second optical plane that is non-parallel to the first optical plane, each oriented to adhere to the Scheimpflug principle with respect to a plane defined by the fan.

In some implementations, a system for generating a line on a working surface with reduced speckle may be configured in accordance with the following aspects.

In general aspect 55, a system comprising:
  an oscillating laser source in the form of a collimated beam that moves in a sweeping cyclic motion within a plane; and
  a line generator that receives the moving collimated beam and projects the light passing there through onto the working surface as a line.

Aspect 56 according to aspect 55, wherein the oscillating laser source comprises a stationary laser beam source and a cyclically moving beam deflector.

Aspect 57 according to aspect 56, wherein the beam deflector comprises a MEMS mirror.

Aspect 58 according to aspect 56, wherein the beam deflector is driven by a galvanometer.

Aspect 59 according to aspect 56, wherein the beam deflector is a solid state unit.

Aspect 60 according to any one of aspects 55-59, wherein the line generator is a linear diffuser.

Aspect 61 according to any one of aspects 55-60, further comprising a field lens located between the oscillating laser source and the line generator.

Aspect 62 according to aspect 61, wherein the field lens is unitary with the line generator.

Aspect 63 according to any one of aspects 55-62, wherein the line generator is mounted in a laser displacement sensor.

Aspect 64 according to aspect 63, wherein the laser displacement sensor is operatively connected to a vision system processor.

Aspect 65 according to any one of aspects 55-59 and 61-64, wherein the line generator comprises an optical component having at least one of a linear diffuser, a hologram and a cylinder array.

Aspect 66 according to aspect 65, wherein the line generator projects the line in a non-continuous pattern.

Aspect 67 according to aspect 66, wherein the non-continuous pattern defines at least one of dots, and line segments separated by non-illuminated gaps.

In some implementations, a method for generating a line with reduced speckle may be implemented in accordance with the following aspects.

In general aspect 68, a method comprising:
  oscillating a laser source in the form of a collimated beam in a sweeping cyclic motion within a plane; and
  transmitting the collimated beam through a line generator and onto the working surface as a line.

Aspect 69 according to aspect 68, wherein the oscillating comprises projecting a stationary laser beam source into a cyclically moving beam deflector.

Aspect 70 according to aspect 68 or 69, wherein the transmitting comprises passing the collimated beam through a field lens located in line with the line generator.

Aspect 71 according to any one of aspects 68-70, wherein the transmitting comprises passing the collimated beam through at least one of a linear diffuser, a hologram and a cylinder array.

Aspect 72 according to any one of aspects 68-71, further comprising receiving reflected light from the working surface, including the line, in a vision system sensor and processing image data generated by the vision system sensor.

In some implementations, a system for reducing at least one of speckle effect and sparkle effect in a line projected on a surface may be configured in accordance with the following aspects.

In general aspect 73, a system comprising:
 a collimated light source;
 an optical component that generates a fan of light within a one or more predetermined angles on each side of a central optical axis; and
 a line generator through which the fan passes located between the optical component and the surface.

Aspect 74 according to aspect 73, wherein the optical component comprises at least one of a MEMS mirror, a solid state deflector and a Powell lens.

Aspect 75 according to aspect 73 or 74, wherein the collimated light source is a laser.

VIII. Conclusion

In should be clear that the above-described line generation system with reduced speckle provides an improved projected line for use in a variety of tasks, including 3D displacement sensors and associated vision system operations. The use of a beam deflector, or other mechanism for cyclically oscillating the source beam, and the linear diffuser in generating the line effectively eliminates the use of a Powell lens or other type line-generating optics. This has the advantage of reducing system cost and significantly improving projected and imaged line quality. The use of a 2D scanning laser in certain embodiments also effectively eliminates the need for separate motion generating components, such as motion a stages, conveyors, etc. to scan an object. Also, by employing a scanning laser in combination with a diffuser, the system effectively blurs out any foreign object defects like dust and dirt on the inner and outer surfaces of optics components. This allows for greater quality in manufacturing the DS.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, as used herein, the terms "slow" and "fast", as they relate to scan rate, are relative terms and not meant to represent any absolute ranges of speed—unless otherwise indicated. Accordingly, this description is meant to be taken only by way of example, and not to otherwise limit the scope of this invention.

What is claimed is:

1. An illumination apparatus for reducing speckle effect in light reflected off an illumination target, the apparatus comprising:
 a light source configured to emit coherent light;
 a linear diffuser comprising a hologram or a cylinder array positioned in an optical path between an illumination target and the light source, the linear diffuser being configured to diffuse the coherent light into diffused light that spreads in one dimension across at least a portion of the illumination target, wherein the diffused light forms a planar fan of light that is generally free of broadening in a direction perpendicular to the one dimension;
 a beam deflector positioned between the light source and the linear diffuser on the optical path; and
 a controller coupled with the beam deflector,
 wherein the controller is configured to operate the beam deflector to direct the coherent light incident on the beam deflector to sweep across different locations on the linear diffuser,
 wherein the different locations span a distance across the linear diffuser that provides sufficient uncorrelated speckle patterns at an image sensor in light reflected from an intersection of the planar fan of light with the illumination target to add incoherently when imaged by the image sensor,
 wherein the hologram or the cylinder array is configured to project the planar fan of light onto the illumination target with an optical characteristic that changes based on a sweep angle of the coherent light on the hologram or the cylinder array, to form a pattern that, based on sweeping of the coherent light incident on the beam deflector along a path along the one dimension and based on the optical characteristic changing with the sweep angle, is non-continuous along the one dimension,
 wherein the linear diffuser is stationary with respect to a base portion of the beam deflector, and
 wherein the controller is configured to operate the beam deflector to direct the coherent light in a cyclically oscillating sweep with respect to the linear diffuser, such that the coherent light is directed through at least half of a cycle of the cyclically oscillating sweep within an exposure time for capture of an image frame.

2. The illumination apparatus of claim 1, wherein the light source comprises a laser.

3. The illumination apparatus of claim 1, wherein the beam deflector comprises a microelectromechanical system (MEMS) mirror or an acousto-optic modulator (AOM) device.

4. The illumination apparatus of claim 1, wherein the linear diffuser comprises an engineered diffuser with a flat top intensity profile along the one dimension.

5. The illumination apparatus of claim 1, wherein the optical characteristic comprises diffracted line spacing in the planar fan of light.

6. The illumination apparatus of claim 1,
wherein the linear diffuser comprises the cylinder array having a scatter angle, and
wherein the linear diffuser is configured to receive the coherent light at a first side of the linear diffuser and output the diffused light from a second side of the linear diffuser,
wherein the second side is opposite the first side, and wherein the diffused light is spread in the one dimension across at least the portion of the illumination target.

7. The illumination apparatus of claim 6, wherein the scatter angle is at least 2·(atan((LL/2)/DO)), where LL is a length of the pattern, and where DO is a working distance between the linear diffuser and the illumination target.

8. A laser displacement measuring system comprising:
a vision system processor;
a camera assembly coupled with the vision system processor;
a laser beam assembly coupled with the vision system processor, the laser beam assembly configured to emit coherent light;
a beam deflector positioned to receive the coherent light;
a controller coupled with the beam deflector; and
a linear diffuser comprising a hologram or a cylinder array positioned in an optical path between an illumination target and the beam deflector,
wherein the controller is configured to operate the beam deflector to direct the coherent light incident on the beam deflector to sweep across different locations on the linear diffuser;
wherein the linear diffuser is configured to diffuse the coherent light, received from the beam deflector at the different locations, into diffused light that spreads in one dimension across at least a portion of the illumination target, wherein the diffused light forms a planar fan of light that is generally free of broadening in a direction perpendicular to the one dimension,
wherein the different locations span a distance across the linear diffuser that provides sufficient uncorrelated speckle patterns at an image sensor in light reflected from an intersection of the planar fan of light with the illumination target to add incoherently when imaged by the image sensor,
wherein the hologram or the cylinder array is configured to project the planar fan of light onto the illumination target with an optical characteristic that changes based on a sweep angle of the coherent light on the hologram or the cylinder array, to form a pattern that, based on sweeping of the coherent light incident on the beam deflector along a path along the one dimension and based on the optical characteristic changing with the sweep angle, is non-continuous along the one dimension,
wherein the linear diffuser is stationary with respect to a base portion of the beam deflector, and
wherein the controller is configured to operate the beam deflector to direct the coherent light in in a cyclically oscillating sweep with respect to the linear diffuser, such that the coherent light is directed through at least half of a cycle of the cyclically oscillating sweep within an exposure time for capture of an image frame by the camera assembly.

9. The laser displacement measuring system of claim 8, wherein the pattern comprises at least one of dots, or line segments separated by non-illuminated gaps.

10. The laser displacement measuring system of claim 8, wherein the optical characteristic comprises diffracted line spacing in the planar fan of light.

11. The laser displacement measuring system of claim 8, wherein the beam deflector comprises a microelectromechanical system (MEMS) mirror or an acousto-optic modulator (AOM) device.

12. The laser displacement measuring system of claim 8, wherein the camera assembly is configured to
capture light reflected from the intersection of the planar fan of light with the illumination target, and
generate image data from the captured light.

13. The laser displacement measuring system of claim 12, wherein the vision system processor is configured to
receive the image data from the camera assembly, and
process the image data to perform at least one of measurement and inspection on a region of the illumination target.

14. The laser displacement measuring system of claim 8, wherein the camera assembly comprises:
the image sensor having a first optical plane, and
a lens assembly with a second optical plane that is non-parallel to the first optical plane, the image sensor and the lens assembly each oriented to adhere to the Scheimpflug principle with respect to the planar fan of light.

15. The laser displacement measuring system of claim 8, wherein the linear diffuser comprises the cylinder array having a scatter angle, and
wherein the linear diffuser is configured to receive the coherent light at a first side of the linear diffuser and output the diffused light from a second side of the linear diffuser, wherein the second side is opposite the first side, and wherein the diffused light is spread in the one dimension across at least the portion of the illumination target.

16. The laser displacement measuring system of claim 15, wherein the scatter angle is at least 2·(atan((LL/2)/DO)), where LL is a length of the pattern, and where DO is a working distance between the linear diffuser and the illumination target.

17. An illumination apparatus for reducing speckle effect in light reflected off an illumination target, the apparatus comprising:
a light source configured to emit coherent light;
a linear diffuser positioned in an optical path between an illumination target and the light source, the linear diffuser being configured to diffuse the coherent light into diffused light that spreads in one dimension across at least a portion of the illumination target, which has an associated exposure time for illumination of the illumination target by the diffused light, wherein the diffused light forms a planar fan of light that is generally free of broadening in a direction perpendicular to the one dimension;
a beam deflector positioned between the light source and the linear diffuser in the optical path;

a cylinder lens positioned in the optical path and configured to operate as a field lens, wherein the cylinder lens is distinct from the linear diffuser; and
a controller coupled with the beam deflector,
wherein the controller is configured to operate the beam deflector to direct the coherent light incident on the beam deflector to sweep across different locations on the linear diffuser within the exposure time for illumination of the illumination target by the diffused light,
wherein the different locations span a distance across the linear diffuser that provides sufficient uncorrelated speckle patterns at an image sensor in light reflected from an intersection of the planar fan of light with the illumination target to add incoherently when imaged by the image sensor within the exposure time for illumination of the illumination target by the diffused light, and
wherein the cylinder lens is positioned in the optical path between the beam deflector and the illumination target, to concentrate the coherent light from the beam deflector onto the linear diffuser, or to concentrate the diffused light from the linear diffuser onto the illumination target.

18. The illumination apparatus of claim 17, wherein the light source comprises a laser.

19. The illumination apparatus of claim 17, wherein the beam deflector comprises a microelectromechanical system (MEMS) mirror.

20. The illumination apparatus of claim 17, wherein the beam deflector comprises an acousto-optic modulator (AOM) device.

21. The illumination apparatus of claim 17, wherein the cylinder lens is positioned in the optical path between the linear diffuser and the beam deflector and configured to increase efficiency by concentrating all of the coherent light directed to the linear diffuser.

22. The illumination apparatus of claim 17, wherein the linear diffuser is positioned in the optical path between the beam deflector and the cylinder lens, and wherein the cylinder lens is configured to increase efficiency by concentrating all of the diffused light directed to the illumination target.

23. The illumination apparatus of claim 17, wherein the linear diffuser comprises an engineered diffuser with a flat top intensity profile along the one dimension.

24. The illumination apparatus of claim 17, wherein the linear diffuser comprises a chirped diffraction grating with a Free Spectral Range (FSR) that causes diffracted line spacing in the planar fan of light to change with a sweep angle of the coherent light incident on the linear diffuser.

25. The illumination apparatus of claim 17, wherein the linear diffuser comprises a hologram or a cylinder array.

26. The illumination apparatus of claim 17, wherein
the linear diffuser is stationary with respect to a base portion of the beam deflector, and
the controller is configured to operate the beam deflector to direct the coherent light in a cyclically oscillating sweep with respect to the linear diffuser, such that the coherent light is directed through at least half of a cycle of the cyclically oscillating sweep within the exposure time for the illumination of the illumination target by the diffused light.

27. The illumination apparatus of claim 17, wherein the cylinder lens is configured to cause the intersection of the planar fan of light with the illumination target to be stationary in the one dimension.

28. A laser displacement measuring system comprising:
a vision system processor;
a camera assembly coupled with the vision system processor;
a laser beam assembly coupled with the vision system processor, the laser beam assembly configured to emit coherent light;
a beam deflector positioned to receive the coherent light;
a controller coupled with the beam deflector;
a linear diffuser positioned in an optical path between an illumination target and the beam deflector;
a cylinder lens positioned in the optical path and configured to operate as a field lens, wherein the cylinder lens is distinct from the linear diffuser,
wherein the controller is configured to operate the beam deflector to direct the coherent light incident on the beam deflector to sweep across different locations on the linear diffuser,
wherein the linear diffuser is configured to diffuse the coherent light, received from the beam deflector at the different locations, into diffused light that spreads in one dimension across at least a portion of the illumination target, which has an associated exposure time for illumination of the illumination target by the diffused light, wherein the diffused light forms a planar fan of light that is generally free of broadening in a direction perpendicular to the one dimension,
wherein the different locations span a distance across the linear diffuser that provides sufficient uncorrelated speckle patterns at an image sensor of the camera assembly in light reflected from an intersection of the planar fan of light with the illumination target to add incoherently when imaged by the image sensor within the exposure time for illumination of the illumination target by the diffused light, and
wherein the cylinder lens is positioned in the optical path between the beam deflector and the illumination target, to concentrate the coherent light from the beam deflector onto the linear diffuser, or to concentrate the diffused light from the linear diffuser onto the illumination target.

29. The laser displacement measuring system of claim 28, wherein
the linear diffuser is stationary with respect to a base portion of the beam deflector, and
the controller is configured to operate the beam deflector to direct the coherent light in a cyclically oscillating sweep with respect to the linear diffuser, and the controller is configured to operate the beam deflector to direct the coherent light through at least half of a cycle of the cyclically oscillating sweep within the exposure time for the illumination of the illumination target by the diffused light.

30. The laser displacement measuring system of claim 28, wherein the linear diffuser comprises an engineered diffuser with a flat top intensity profile along the one dimension.

31. The laser displacement measuring system of claim 28, wherein the linear diffuser comprises a cylinder array.

32. The laser displacement measuring system of claim 28, wherein the linear diffuser comprises a hologram.

33. The laser displacement measuring system of claim 32, wherein the hologram is configured to project the planar fan of light onto the illumination target in a non-continuous pattern.

34. The laser displacement measuring system of claim 33, wherein the non-continuous pattern comprises at least one of dots, and line segments separated by non-illuminated gaps.

35. The laser displacement measuring system of claim 28, wherein the linear diffuser comprises a chirped diffraction grating with a Free Spectral Range (FSR) that causes diffracted line spacing in the planar fan of light to change with a sweep angle of the coherent light incident on the linear diffuser.

36. The laser displacement measuring system of claim 28, wherein the beam deflector comprises a microelectromechanical system (MEMS) mirror.

37. The laser displacement measuring system of claim 28, wherein the beam deflector comprises an acousto-optic modulator (AOM) device.

38. The laser displacement measuring system of claim 28, wherein the cylinder lens is positioned in the optical path between the linear diffuser and the beam deflector and is configured to increase efficiency by concentrating all of the coherent light directed to the linear diffuser.

39. The laser displacement measuring system of claim 28, wherein the linear diffuser is positioned in the optical path between the beam deflector and the cylinder lens, and
the cylinder lens is configured to increase efficiency by concentrating all of the diffused light directed to the illumination target.

40. The laser displacement measuring system of claim 28, wherein the laser beam assembly comprises a laser.

41. The laser displacement measuring system of claim 28, wherein the camera assembly is configured to
capture light reflected from the intersection of the planar fan of light with the illumination target, and
generate image data from the captured light.

42. The laser displacement measuring system of claim 41, wherein the vision system processor is configured to
receive the image data from the camera assembly, and
process the image data to perform at least one of measurement and inspection on a region of the illumination target.

43. The laser displacement measuring system of claim 28, wherein the image sensor comprises a first optical plane and a lens assembly with a second optical plane that is non-parallel to the first optical plane, each oriented to adhere to the Scheimpflug principle with respect to the planar fan of light.

44. The laser displacement measuring system of claim 28, wherein the cylinder lens is configured to cause the intersection of the planar fan of light with the illumination target to be stationary in the one dimension.

* * * * *